US008105401B2

(12) United States Patent
Neves et al.

(10) Patent No.: US 8,105,401 B2
(45) Date of Patent: Jan. 31, 2012

(54) PARALLEL PATH, DOWNDRAFT GASIFIER APPARATUS AND METHOD

(75) Inventors: Alan M. Neves, Ogden, UT (US); Grover R. Brockbank, Salt Lake City, UT (US); Morris K. Ebeling, Jr., Salt Lake City, UT (US)

(73) Assignee: Refill Energy, Inc., Woods Cross, UT (US)

( * ) Notice: Subject to any disclaimer, the term of this patent is extended or adjusted under 35 U.S.C. 154(b) by 874 days.

(21) Appl. No.: 12/170,421

(22) Filed: Jul. 9, 2008

(65) Prior Publication Data

US 2009/0119993 A1 May 14, 2009

Related U.S. Application Data

(60) Provisional application No. 60/948,950, filed on Jul. 10, 2007.

(51) Int. Cl.
*C10J 3/46* (2006.01)

(52) U.S. Cl. ........ 48/197 R; 48/61; 48/127.1; 48/127.9; 48/76; 48/212; 48/199 R; 48/203; 110/346; 110/347; 110/348; 110/157

(58) Field of Classification Search ................ 48/197 R, 48/76, 127.1, 127.9; 110/230–233, 229, 110/342, 346, 255
See application file for complete search history.

(56) References Cited

U.S. PATENT DOCUMENTS

| | | | | |
|---|---|---|---|---|
| 1,777,449 | A | * | 10/1930 | Rath .............................. 201/2.5 |
| 2,270,245 | A | * | 1/1942 | Barker ......................... 373/113 |
| 2,600,425 | A | * | 6/1952 | Parry ............................ 422/204 |
| 3,920,417 | A | | 11/1975 | Fernandes |
| 4,583,992 | A | | 4/1986 | Rogers |
| 4,929,254 | A | | 5/1990 | Kooiman |
| 5,138,957 | A | | 8/1992 | Morey |
| 5,226,927 | A | | 7/1993 | Rundstrom |
| 5,435,983 | A | | 7/1995 | Antal, Jr. |
| 5,484,465 | A | | 1/1996 | Hilliard |
| 5,580,362 | A | | 12/1996 | Manulescu |
| 5,607,487 | A | | 3/1997 | Taylor |
| 6,913,632 | B1 | | 7/2005 | Ling |
| 6,941,879 | B2 | | 9/2005 | Hahn |
| 7,007,616 | B2 | | 3/2006 | Abrams et al. |
| 7,226,566 | B2 | | 6/2007 | Beierle |
| 2004/0120874 | A1 | | 6/2004 | Zauderer |
| 2004/0182294 | A1 | | 9/2004 | Hahn et al. |
| 2004/0221778 | A1 | | 11/2004 | Pallett |
| 2005/0256212 | A1 | | 11/2005 | Norbeck |
| 2006/0196398 | A1 | | 9/2006 | Graham |
| 2007/0220805 | A1 | | 9/2007 | Leveson |
| 2007/0249737 | A1 | | 10/2007 | Miller |

OTHER PUBLICATIONS

Lemley, *Anything Into Oil*, Discover Magazine, May 1, 2003, http://discovermagazine.com/2003/may/featoil/.

* cited by examiner

*Primary Examiner* — Kaity V. Handal
(74) *Attorney, Agent, or Firm* — Warren M. Pate, LLC

(57) ABSTRACT

A method for using a downdraft gasifier comprising a housing and a refractory stack contained within the housing. The refractory stack may comprise various sections. Apertures in the sections may be aligned to form multiple columnar cavities. Each columnar cavity may comprise an individual oxidation zone. The method of use may include the steps of placing a feedstock into an upper portion of the refractory stack, measuring the temperature of each columnar cavity, and adjusting the flow of oxygen to a particular columnar cavity to maintain the temperature of the particular columnar cavity within a particular range.

20 Claims, 16 Drawing Sheets

PARALLEL PATH, DOWNDRAFT GASIFIER APPARATUS AND METHOD

RELATED APPLICATIONS

This application claims the benefit of U.S. Provisional Patent Application Ser. No. 60/948,950 filed Jul. 10, 2007.

BACKGROUND

1. The Field of the Invention

This invention relates to fuel generation and, more particularly, to novel systems and methods for gasification of municipal solid waste and other feedstocks.

2. The Background Art

Manufactured gas, or synthesis gas (syn-gas) as it is more often called today, comprises the unburned gasses (carbon monoxide and hydrogen gas) created by incomplete combustion of an organic raw material. Gasification (the process of generating manufactured gas) was discovered independently in both France and England. By 1850, gasification of coal had developed to where much of London was lit with manufactured gas, "town gas," or "coal gas" as it was called. By 1920, many towns and cities throughout the United States supplied manufactured gas to their residents through local "gasworks."

Following 1930, as natural gas pipelines began to proliferate, low-cost natural gas displaced manufactured gas. The gasification industry was largely abandoned and forgotten. However, beginning with the oil embargo of the 1970's, there has been an almost continual increase in the cost of fuel. Accordingly, what is needed today is an efficient system, process, and gasifier that can receive a wide variety of inputs and efficiently produce a clean fuel.

BRIEF SUMMARY OF THE INVENTION

In view of the foregoing, in accordance with the invention as embodied and broadly described herein, a method and apparatus are disclosed in one embodiment of the present invention as including a gasifier system. In selected embodiments, a gasifier in accordance with the present invention may include a housing comprising a base, a lower section resting on and extending upward from the base, an intermediate section resting on and extending upward from the lower section, and an upper section resting on and extending upward from the intermediate section. The lower section may include a gas outlet and a waste outlet. The upper section may include a feedstock inlet.

In operation, feedstock may enter a gasifier through the feedstock inlet and travel down through the gasifier toward the waste outlet. A gasifier may include four zones that function in unison to simultaneously process the feedstock and generate clean syn-gas. These zones are the drying zone, tar-formation zone, oxidation zone, and reduction zone.

The drying zone may largely be contained within the upper section of a gasifier. As the feedstock is stored within the upper section, heat radiating up from a lower, oxidation zone may drive off the residual moisture as water vapor. The water vapor may be contained within the gasifier and participate in chemical reactions in the reduction zone when carbon reacts with the water vapor to generate carbon monoxide and hydrogen ($H_2$), the desired outputs.

The temperature within the tar-formation zone may be higher than that within the drying zone. In the tar-formation zone, the feedstock may be heated without oxygen to produce oil, tar, char, and charcoal. These products may provide a ready supply of carbon for the chemical reactions that later occur in the reduction zone.

In the oxidation zone, all or part of the volatile materials may be oxidized to generate the heat for the chemical reactions of the process. As feedstock passes out of the oxidation zone, approximately 20% to 30% of the organic material may have been oxidized and the oxygen is typically consumed. Accordingly, there is typically no flame in the succeeding, reduction zone. Some combustible gases may be generated in the oxidation zone.

In the reduction zone, the hot gases generated in the oxidation zone may react with the carbonaceous material generated in the tar-formation zone to convert most of the feedstock to syn-gas. During these reactions the sensible heat or heats of the chemical reactions are converted into chemical energy for the syn-gas. This, being endothermic, may result in cooling of the mass to below 800° C. This may effectively stop the chemical processes and no further syn-gas is typically formed thereafter.

In selected embodiments, a gasifier may include an enclosed top. The enclosed top may stop all or some portion of the atmospheric nitrogen from entering a gasifier and generating undesirable compounds. Also, the enclosed top may assist in maintaining the desired temperatures within the gasifier.

In certain embodiments, a refractory stack may contain and define the tar-formation, oxidation, and reduction zones. A refractory stack may be housed within the intermediate section of a gasifier and include a plurality of sections. The sections may be formed of a heat resistant material. For example, they may be formed of ceramic or refractory. Accordingly, a refractory stack may improve the heat retention, durability, and life span of a gasifier.

The number of sections in a refractory stack may vary between embodiments. In one embodiment, a refractory stack may include five sections, namely, a lower manifold, a lower intermediate section, a middle intermediate section, an upper intermediate section, and an upper manifold. The various sections may be stacked one on top of the other. The interior of the upper manifold may contain and define the tar-formation zone. The interior of the lower manifold may contain and define the reduction zone.

A shaft may extend from top to bottom through a gasifier. One or more motors may urge rotation of the shaft about a vertical axis. In selected embodiments, a gasifier may include a mixing blade connected to rotate with the shaft. As the shaft rotates, the mixing blade may mix the contents of the upper section and upper manifold. This mixing may improve the distribution of heat rising from the oxidation zone, thereby improving the drying effect. In selected embodiments, the mixing blade may scrape the contents of the upper manifold away from an interior surface thereof, removing any dead or stagnant zones.

Certain sections of a refractory stack may include multiple apertures extending vertically therethrough. For example, in one embodiment, the lower intermediate, middle intermediate, upper intermediate, and upper manifold section may each include multiple apertures extending vertically therethrough. These apertures may be aligned between the various sections to form multiple columnar cavities. Each columnar cavity may extend from the upper manifold to the lower manifold, placing the upper manifold in communication with the lower manifold.

Each columnar cavity may act as an independent oxidation zone and have a dedicated heater, dedicated gas ports, and dedicated temperature sensors. These heaters, ports, and sensors may be positioned within or proximate the apertures defining the columnar cavities. Thus, the narrowness of the cavities and the positioning of the heaters, ports, and sensors may support individual, rapid, and precise control of the environment within each columnar cavity.

In selected embodiments, the various apertures aligning to form the columnar cavities may not be exactly cylindrical. For example, the apertures in selected sections may be somewhat conical in shape, converging when viewed with respect to the downward flow of the feedstock. Apertures so configured may create one or more lips or overhangs within the columnar cavities. Tucked on the underside of such overhangs may be grooves. These grooves may extend the circumference of the columnar cavities. Certain grooves may be used to distribute gas (e.g., oxygen) around a circumference of a columnar cavity. Other grooves may house and protect a heater. Accordingly, a heater may extend circumferentially around a columnar cavity. A heater may provide greater control in initiating and automating the gasification process. Additionally, a heater may reduce the amount of time required to bring a gasifier into optimal production.

In certain embodiments, a grate may be positioned within a gasifier to form the bottom boundary of the reduction zone. A grate may be positioned proximate the underside of a lower manifold. A lower manifold may include an aperture extending vertically therethrough. The aperture may have an undulating perimeter. A plurality of balls may be supported by the grate and held by the grate within the aperture of the lower manifold.

A grate may be connected to rotate with a shaft, which may result in rotation of the balls. Because an aperture having an undulating perimeter laterally contains the balls, relative rotation between the balls and the aperture may result in agitation or mixing of the balls. The resultant bed of moving and mixing balls may provide a semi permeable barrier, permitting syn-gas and small particles to work their way through, while blocking the passage of larger particles. Thus, only feedstock that has been sufficiently oxidized and reduced down may exit through the bed.

In certain embodiments, a gasifier may include one or more wiper blades positioned within the reduction zone. A wiper blade may be connected to rotate with the shaft. Accordingly, as the shaft rotates, so may one or more wiper blades. A wiper blade may urge the contents of the lower section toward the waste outlet.

A gasifier system in accordance with the present invention may include a control system. A control system may provide computer-based monitoring and control of selected subsystems of a gasifier system. The subsystems controlled by a control system may largely be divided into two classes, namely feedback systems and implementation systems. Through the feedback systems, a control system may learn what is happening within the gasifier or other components of the gasifier system. Through the implementation systems, a control system may effect changes to the operation of the gasifier system, sound an alarm, or the like.

An extensive sensor suite may form the backbone of a control system's feedback systems. By monitoring various sensors such as temperature sensors, pressure sensors, flow meters, and the like, a control system may learn what is happening within a gasifier. A control system then may issue appropriate commands to one or more implementation systems such as a heater suite, gas-delivery system, and the like. For example, a control system may instruct a gas-delivery system to adjust the flow of gas (e.g., oxygen, oxygen enriched air, air) to a particular columnar cavity. The control system may increase the flow to raise the temperature within the columnar cavity, decrease the flow to lower the temperature within the columnar cavity, or the like to maintain the temperature of the columnar cavity within a particular range.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
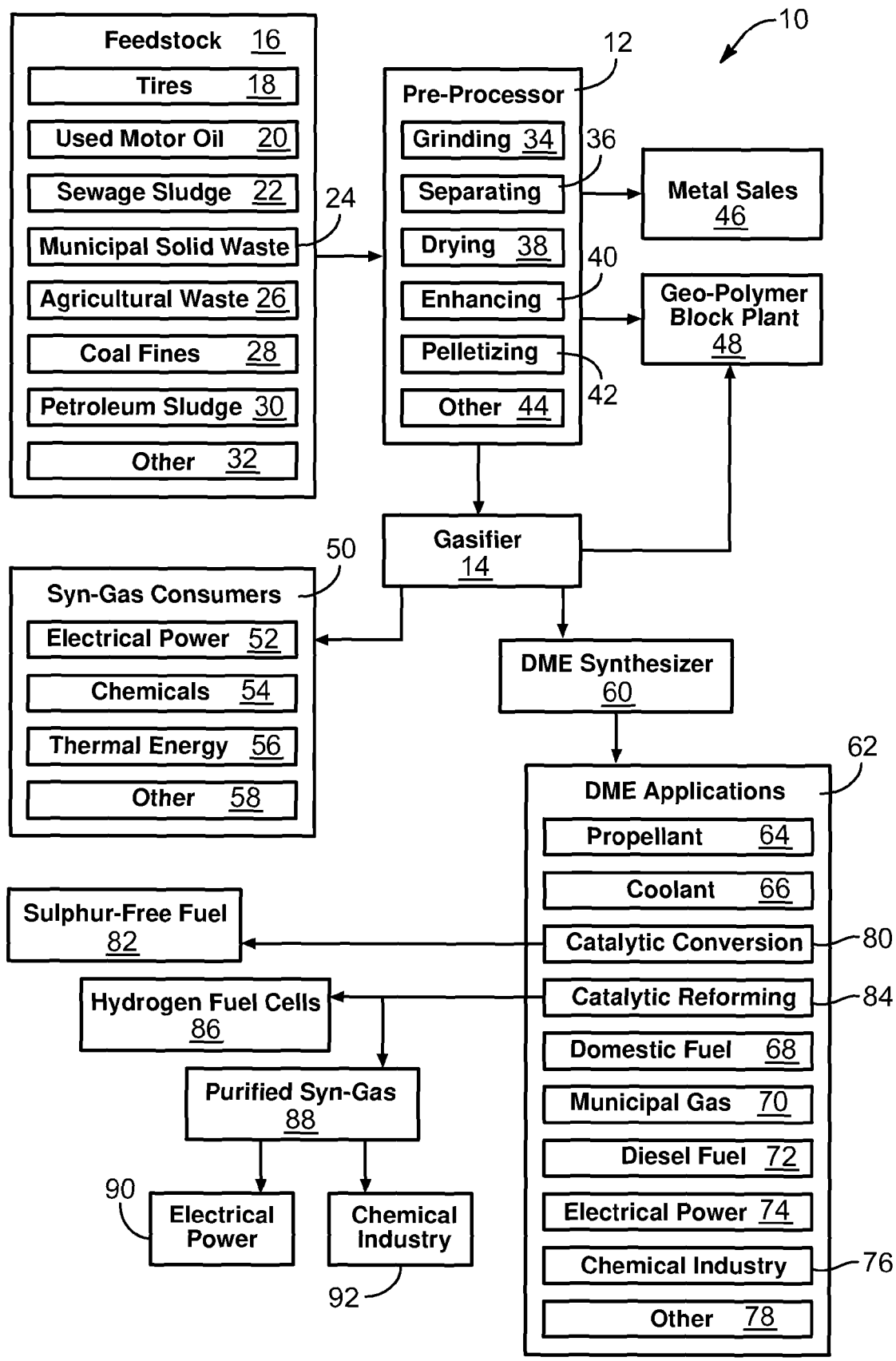
FIG. 1 is a schematic block diagram of an overall system and material flow in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, every year, large quantities of municipal solid waste (MSW) are collected for disposal. While most of the materials found within MSW can be recycled in some manner, the costs of recycling the different materials can vary greatly. It is currently feasible to recycle only a portion of the MSW generated. Accordingly, large quantities of MSW are being deposited in landfills each year.

In selected embodiments, systems and methods in accordance with the present invention may support use of an entire MSW stream, or some subset thereof. This may virtually eliminate the need for new or ever expanding landfills. In so doing, systems and methods in accordance with the present invention may reduce ground water pollution, eliminate odor problems, and limit the amount of methane released into the atmosphere. With the systems and methods of the present invention, waste may be regarded as a valuable resource.

In certain embodiments, the base components of a system 10 in accordance with the present invention may be a preprocessor 12 and a gasifier 14. A preprocessor 12 may receive a feedstock 16 and convert it to a form acceptable to a gasifier 14. A gasifier 14 may receive a pre-processed feedstock and convert it to a gaseous fuel (e.g., syn-gas). The gaseous fuel may then be used as is or converted to more useful fuels or products.

A feedstock 16 in accordance with the present invention may be or include materials such as tires 18, used motor oil 20, sewage sludge 22, MSW 24, agricultural waste 26, coal fines 28, petroleum sludge 30, or some other 32 material such as landfill gas, natural gas, and the like. A preprocessor 12 may receive the feedstock 16 and grind 34, separate 36, dry 38, pelletize 40, or otherwise 42 process the feedstock 16 to prepare it for a gasifier 14.

A preprocessor 12 may also enhance 44 a feedstock. For example, coal, coal fines, or some other carbon source may be added to a feedstock 16 to enhance 44 the gasification thereof. Additionally, one or more pollutant absorbent binders (e.g., zeolite, dolomite) may be added to the feedstock 16. The amount of the various binders added may vary, depending on the nature of the feedstock and the pollutants associated therewith. As the feedstock is gasified, the binders may react with and trap chemicals such as sulphur, chlorine, and the like that may be harmful if released into the environment. The tied up pollutant compounds may leave a gasifier 14 looking like glassy sand. This glassy sand may be used as filler by a block plant 48.

The particular functions performed by a preprocessor 12 or as part of a preprocessing step may vary depending on the nature of the feedstock 16. For example, in one exemplary embodiment, the primary ingredient of a feedstock 16 may be unsorted MSW 24. As the MSW 24 is received, large items such as appliances, bicycles, engine blocks, etc. may be removed (e.g., by hand) and sold 46 to scrap metal dealers. A preprocessor 12 may include a flail mill to break up garbage bags and the like contained with the MSW 24. The preprocessor 12 may also include a magnet to remove free ferrous metals from the MSW 24.

The preprocessor 12 may also include a grinder to grind 34 the MSW 24. For example, the MSW 24 may pass through a slow turning, size-reduction sheer (e.g., a sheer of 600 horsepower or larger). Accordingly, a preprocessor 12 may grind up furniture, carpet, towels, barrels, and almost anything else that may be contained within the MSW 24. The preprocessor 12 may reduce everything to pieces as small as desired (e.g., no larger than six inches in length).

The preprocessor 12 may be programmed to take protective action upon encountering abnormalities within the MSW 24. For example, if a large, hard, nonmagnetic object (e.g., an aluminum engine block) enters a preprocessor 12 or some component thereof (e.g., a grinder), the preprocessor 12 may reverse itself one or more times, shut down, sound an alarm, take some other protective action, or the like. The offending item may then be removed (e.g., manually) and the preprocessor 12 may continue its operation.

Continuing with the exemplary embodiment, the ground MSW 24 may then be conveyed through a magnetic and eddy current separation process. This process may collect additional ferrous metals freed in the grinding process and repel aluminum, brass, and other metals out of the conveyed MSW 24. Accordingly, a high percentage of the saleable metals may be removed and separated. These metals may be sold 46 to scrap metal dealers.

The remaining MSW 24 may be ground down even further (e.g., to one half inch in length or smaller). This additional grinding 34 may free such items as nails, paper clips, and staples, and the like. The preprocessor 12 may include an air classifier. The air classifier may separate 36 and remove the dirt, rocks, glass, remaining metals, and the like from the MSW 24, leaving the gasifiable portion of the MSW 24 stream. Materials such as dirt, rocks, glass, and the like may be used as filler by a block plant 48. For example, the dirt, rocks, and glass may be combined with the glassy sand produced by the binders and be bound with a geo-polymer binder to make a strong, concrete-like material. This material may be used to form building blocks, power poles, highway dividers, and the like.

Coal, coal fines, or some other carbon source may be added to the gasifiable portion of the MSW 24. Also, one or more pollutant absorbent binders may be added. The resulting composition may be mixed and pelletized. The pellets may provide the fuel for a gasifier 14 in accordance with the present invention.

In selected embodiments, the pellets produced by a preprocessor 12 may have no more than about 30% moisture content. This may improve the efficiency of the gasification process. Accordingly, if the feedstock 16 includes significant quantities of sewage sludge 22, a preprocessor 12 may expend significant energy in drying 38 the sludge. Conversely, if the feedstock 16 is primarily MSW 24, a preprocessor 12 may expend significant energy in grinding 34 and separating 36.

In certain applications, it may be desirable to mix various feedstocks 16 to improve the efficiency of a system 10 in accordance with the present invention. For example, a city may produce large quantities of sewage digester sludge 22 and MSW 24. The sludge 22 and MSW 24 may be mixed to form a feedstock 16. In such mixtures, lowering the percentage of sludge 22 may improve the efficiency of the system 10. It is believed that the increased percentage of MSW 24 may lower the overall moisture content of the mixture and, therefore, require less energy to dry the feedstock 16 to the desired moisture level (e.g., 25% to 30% moisture) prior to pelletizing.

In general, it is undesirable to let MSW 24 and certain other feedstocks 16 accumulate, waiting to be processed. Accordingly, a system 10 may support rapid swapping in and out of components or equipment modules (e.g., preprocessors 12, gasifiers 14, and the like). For example, a system 10 or selected components thereof may include quick connects and disconnects for conduits, electrical wiring, and the like. A system 10 or selected components thereof may be mounted on skids to facilitate rapid manipulation thereof within a production facility. Also, a plant may feature back-up modules in each of the required processes. When one component or equipment module is removed for repair or service, another equivalent module may be inserted in its place. Accordingly, down time and the accumulation associated therewith may be minimized or eliminated.

The flow rate of MSW 24 collection may vary for seasonal and other reasons. Accordingly, a system 10 in accordance with the present invention may include one or more balers. A baler may bale and wrap the excess MSW 24 during days of higher flow rate. These wrapped bales may be waterproof and odorless. They may be stacked as necessary, to be retrieved, passed through a preprocessor 12, and gasified on days of lower flow rate. This could be months after the MSW 24 was collected and baled.

Inside a gasifier 14, a pre-processed feedstock 16 may undergo partial oxidation to produce synthesis gas or "syn-gas." The syn-gas produced may primarily comprise hydrogen and carbon monoxide. Hydrogen and carbon monoxide are primary building blocks for many fuels and chemicals. Moreover, syn-gas itself may be a clean burning fuel suitable for use in duel-fuel diesel engines, gas turbines, steam boilers, and the like. In selected embodiments, the syn-gas produced by a gasifier 14 in accordance with the present invention may be so clean (e.g., free from pollutants) that it does not require hot-gas cleanup In certain embodiments, the syn-gas generated by a gasifier 14 in accordance with the present invention may range from about 300 BTU per cubic foot (2670 kilocalories per cubic meter) to about 700 BTU per cubic foot (6230 kilocalories per cubic meter). The specific BTU content may depend on the desired output. For example, a cleaner gas for fuel production may have about 300 BTU per cubic foot (2670 kilocalories per cubic meter) and be produced in greater quantities, while a gas to be burned in the generation of electricity may be about 700 BTU per cubic foot (6230 kilocalories per cubic meter) or above and be produced in lesser quantities.

Once the syn-gas has been generated, it may be used in a number of ways. For example, the syn-gas may be sold to syn-gas consumers 50. Such customers 50 may use the syn-gas as fuel for generating electricity 52, a feedstock for generating other chemicals 54, fuel for heating purposes 56, or as something else 58. Alternatively, syn-gas may be passed to a synthesizer 60 to be converted to dimethyl ether (DME).

In selected embodiments, the various components of a system 10 in accordance with the present invention may be modular. Accordingly, a system 10 may produce syn-gas for multiple uses or in multiple forms and may switch to meet immediate needs. For example, during peak demand during the day, a system 10 may direct all or a significant portion of the syn-gas produced to an on-site electric power generation system 52. During times of lower demand, the syn-gas may be passed to a synthesizer 60 and converted to DME.

DME has many viable applications 62. It may be used as a propellant 64 in hair spray, spray paint, and the like. It is generally considered to be safer to breathe than other propellants. DME may be used as a coolant 66 within refrigeration systems. DME may also be used as a domestic fuel 68 (e.g., a substitute for propane), a municipal fuel 70 (e.g., a substitute for natural gas), and a clean burning diesel fuel 72 with a cetane value greater than fifty-five. DME diesel fuel is a gas at standard temperatures and pressures. However, it can be liquefied at a significantly lower pressure than fuels like propane. Additionally, like syn-gas, DME may be used as a fuel for generating electrical power 74, a feedstock in generating other chemicals 75, or as something else 78.

In selected embodiments, DME may be further processed to obtain other desired outputs. For example, DME may be passed through a catalytic conversion 80 to generate a sulphur-free fuel 82. Alternatively, DME may be passed through a catalytic reformation 84 to generate hydrogen fuel cells 86 or purified syn-gas 88, which itself may be used as a fuel for generating electrical power 90, a feedstock in generating other chemicals 92, etc.

A system 10 in accordance with the present invention may support field installations. For example, there are natural gas wells capable of producing significant quantities of natural gas that are not currently being utilized. This is largely due to economics. The quantities of natural gas simply cannot justify the cost of connecting the wells to a pipeline for collection and transport of that natural gas. Accordingly, the wells are "stranded" and left dormant.

In selected embodiments, systems 10 in accordance with the present invention may be assembled at the sites of such wells. Each such system 10 may then receive natural gas as a feedstock 16. This feedstock 16 may require little or no pre-processing and may be passed directly input into a gasifier 14. A process in accordance with the present invention may then be followed until the natural gas is converted to DME, jet fuel, diesel, gasoline, or the like for transport to market by vehicle. By converting the natural gas to a more compact fuel, the value of that fuel may justify the costs of the system 10 and the transport of the fuel to market.

Figure 2:
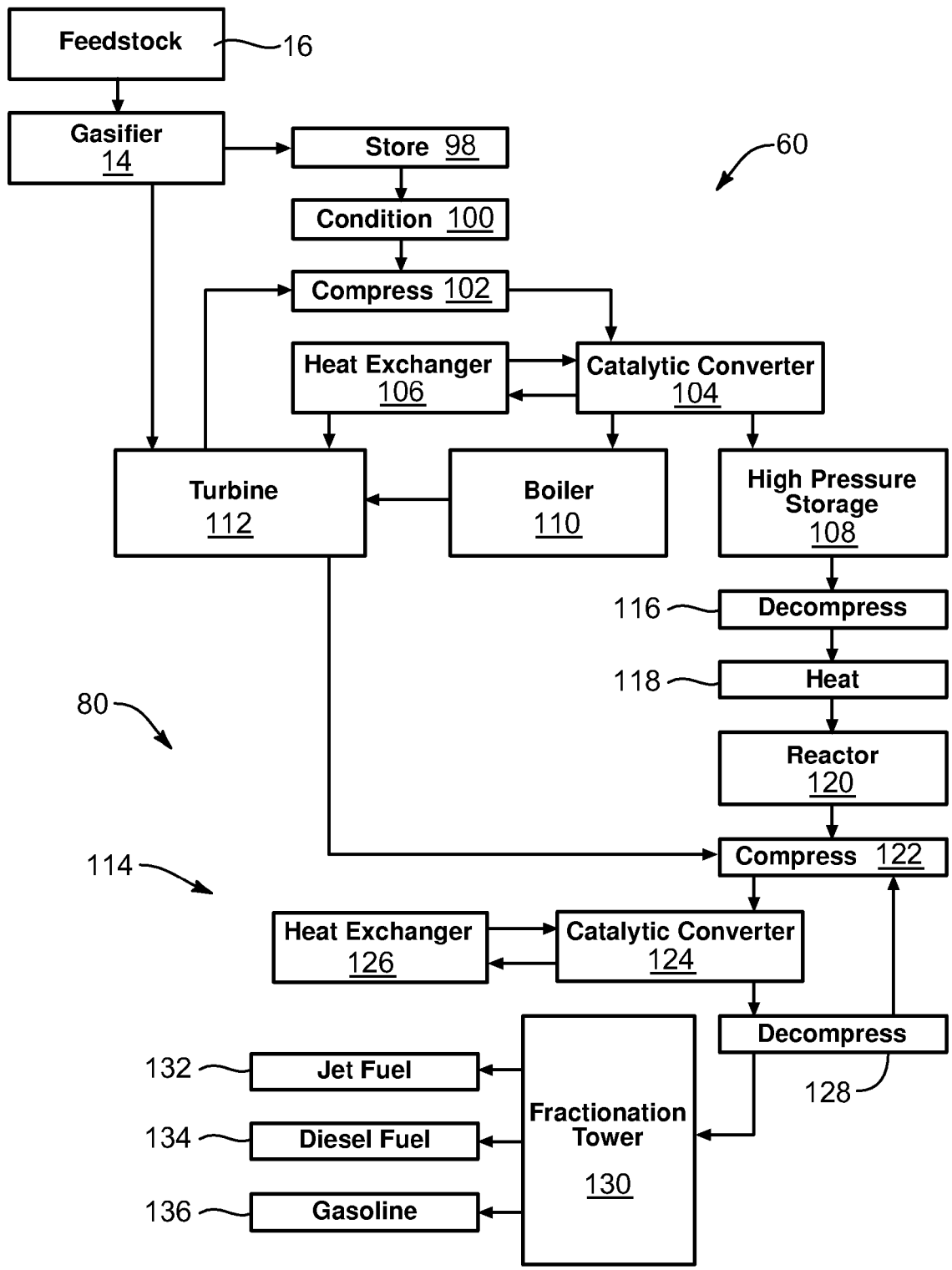
FIG. 2 is a schematic block diagram of a system and method for using the outputs of a gasifier in accordance with the present invention.

Referring to FIG. 2, in selected embodiments, a DME synthesizer 60 may convert syn-gas to DME in a catalytic process. In one embodiment, the conversion may be achieved using a co-catalyst system including a methanol synthesis catalyst and a dehydration catalyst. In such a process, syn-gas may be converted to methanol, followed instantly by the dehydration of the methanol to yield DME.

Prior to being converted to DME, syn-gas may be stored 98 and conditioned 100 as desired or necessary. To initiate the conversion, the syn-gas may be compressed 102 (e.g., to about 40 atmospheres (4040 kilopascals)) before being passed to a catalytic converter 104. The two catalytic reactions typically require only a fraction of a second to occur and are highly exothermic. Accordingly, timely heat removal may prevent the catalytic surfaces from coking up and deactivating.

In certain embodiments in accordance with the present invention, a catalytic converter 104 may comprise a cyclone reactor 104. For example, a catalytic converter 104 may be a cyclone reactor 104 as disclosed in International Publication No. WO 2005/090272 A1, which is hereby incorporated by reference. In such embodiments, small granular solid catalysts may be carried in an oil slurry. Syn-gas may be bubbled through the slurry as it moves rapidly through a reactor 104. The heat of the catalytic reactions may be transferred to the slurry. Once the slurry exits the reactor 104, it may enter a heat exchanger 106 and the heat of the catalytic reactions may be removed.

The process of passing syn-gas through a catalytic converter 104 may be iterative. For example, in one embodiment, a single pass through a catalytic converter 104 may convert a certain portion of the syn-gas to DME and generate a certain amount of heat. The DME, which may be a liquid at the elevated pressure, may be separated from the syn-gas and passed to a pressurized storage container 108. The syn-gas may be passed again through the catalytic converter 104. Meanwhile, the slurry may return to the catalytic converter 104 from the heat exchanger. This may be repeated one or more times (e.g., three times).

Alternatively, multiple (e.g., three) catalytic converters 104 may be arranged in series. Accordingly, the syn-gas exiting a first converter 104 may be the input to a second converter 104, and so forth. Each converter 104 may be connected to a single, common heat exchanger 106 or to a separate heat exchanger 106. In such an embodiment, all but about 15% of the syn-gas may be converted into DME.

Once the desired portion or percentage of the syn-gas has been converted to DME, any residual syn-gas may be used as desired or necessary. In one embodiment, the residual syn-gas may be a clean, burnable gas. Accordingly, it may be applied to any suitable use. In certain embodiments, the residual syn-gas may be used as fuel for a boiler 110. The boiler 110 may generate steam for driving a turbine 112. The turbine 112 may be used to generate electricity, drive a compressor, or the like. For example, in certain embodiments, the power output by a turbine 112 may be used to compress 102 the syn-gas, run a preprocessor 12, and the like. Alternatively, the residual syn-gas may be used in an Integrated Gasification Combined Cycle (IGCC).

In selected embodiments, one or more heat exchangers 106 may use the heat extracted from the slurry to heat steam. This heated steam may also be passed to the turbine 112. Also, heat may be extracted from a gasifier 14 (e.g., from cooling the syn-gas after it exits a gasifier 14) and passed to a turbine 112. In certain embodiments, all of a portion of the syn-gas produced by a gasifier 14 may be used in an IGCC. Thus, the overall efficiency of a system 10 in accordance with the present invention may be increased in a variety of ways.

Once generated, DME may be used, sold, or converted into other products. For example, in certain embodiments of a system and method in accordance with the present invention, DME may be passed to a fuel synthesizer 114 to be catalytically converted into jet fuel, diesel fuel, and gasoline. In selected embodiments, a fuel synthesizer 114 may decompress 116 (e.g., to about 2 atmospheres (202 kilopascals)) and heat 118 (e.g., to about 400° C.) the DME. The synthesizer 114 may then pass the DME through a reactor 120 to convert the DME to lower olefins. In selected embodiments, the reactor 120 may be a fluidized bed reactor 120. The synthesizer 114 may then compress 122 (e.g., to about 50 atmospheres (5050 kilopascals)) the lower olefins.

A fuel synthesizer 114 may include a catalytic converter 124 for effecting oligomerization of the lower olefins to produce liquid fuel. In selected embodiments, a catalytic converter 124 may be a cyclone reactor 124 as disclosed in International Publication No. WO 2005/090272 A1. A catalytic converter 124 may operate in conjunction with a heat exchanger 126 and in an iterative manner, as described hereinabove for the catalytic converter 104 and heat exchanger 106 of a DME synthesizer 60.

Once generated, the liquid fuel may be decompressed 128 and passed to a fractionation tower 130. Energy extracted in the decompression process 128 may be used to compress 122 DME before it enters a catalytic converter 124. Within a fractionation tower 130, the liquid fuel may be divided into about 49% sulfur-free, synthetic jet fuel, 40% sulfur-free, liquid, synthetic diesel fuel and 11% synthetic gasoline of about ninety-two octane. The conversion rate between DME and liquid fuel may be about 51%. Thus, each liter of liquid fuel may have close to double the BTU content of DME. Moreover, each liter of liquid fuel may have close to double the wholesale value of DME.

Figure 3:
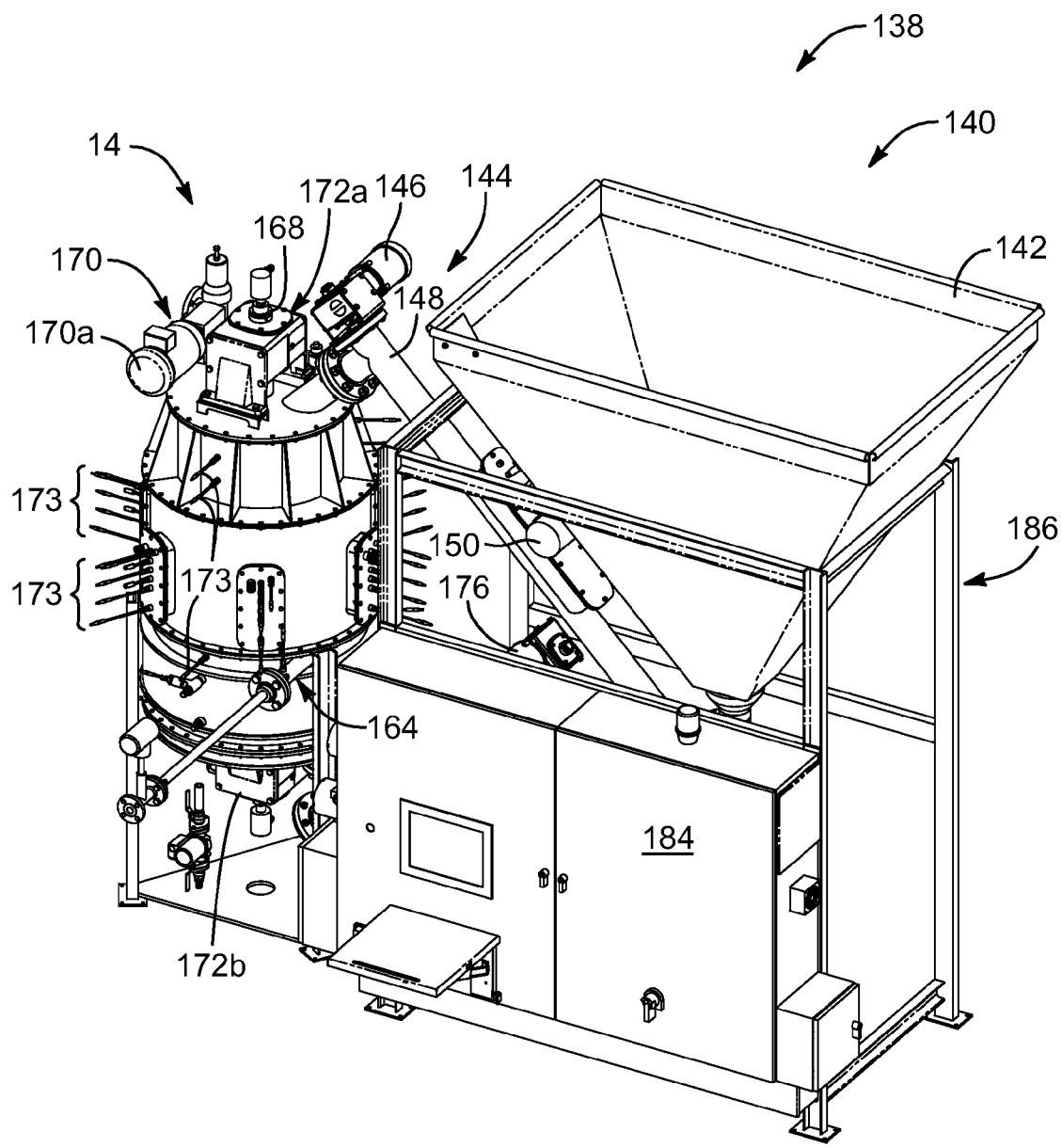
FIG. 3 is a front, perspective view of one embodiment of a gasifier system in accordance with the present invention.
Figure 4:
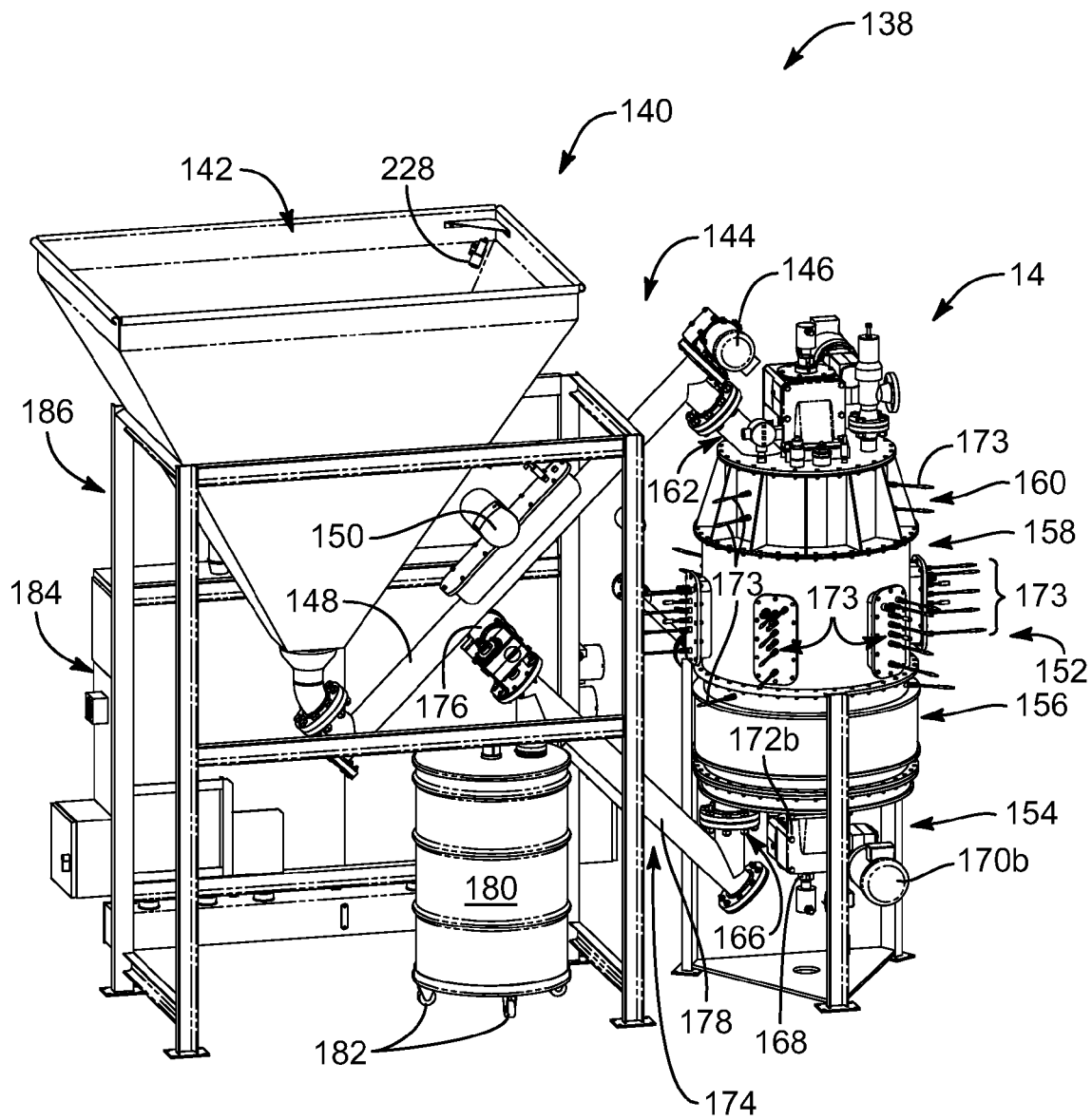
FIG. 4 is a back, perspective view of the gasifier system of FIG. 3.

Referring to FIGS. 3 and 4, a gasifier system 138 may include a gasifier 14 and one or more systems supporting operation of the gasifier 14. In selected embodiments, a gasifier system 138 may include a feed system 140. A feed system 140 may include a hopper 142 for receiving and storing feedstock 16 (e.g., pre-processed feedstock). A hopper 142 may be mounted directly onto the top of a gasifier 14. Accordingly, a hopper 142 may feed feedstock 16 directly into a gasifier 14 under the impetus of gravity. Such an arrangement may simplify and compact the system 138.

In other embodiments, a conveyor system 144 may transport feedstock 16 from a hopper 142 to a gasifier 14. In certain embodiments, a conveyor system 144 may include a motor 146, a conduit 148, and an auger positioned within the conduit 148. The conduit 148 may extend from the hopper 142 to the gasifier 14. The motor 146 may urge rotation of the auger within the conduit 148, thereby propelling feedstock 16 from one end of the conduit 148 (e.g., the end near the hopper 142) to the other (e.g., the end near the gasifier 14).

In selected embodiments, a feed system 140 may be placed under vacuum. This may reduce the amount of nitrogen entering a gasifier 14, thereby facilitating production of a clean syn-gas. This may be done by connecting and positioning a vacuum pump 150 to evacuate air from the conduit 148 of the feed system 140. In one embodiment, the vacuum pump 150 may operate continuously and reduce, by some percentage, the amount of air within the conduit 148. In such an arrangement, the feedstock 16 within the hopper 142 and conduit 148 may provide a barrier to backfilling air (e.g., air entering the system 140 from the surroundings in an effort to resolve the pressure differential caused by the vacuum pump 150). While not perfect, the barrier may permit at least a partial vacuum to be maintained in the feed system 140.

Alternatively, multiple gates may be included within the feed system 140 to seal it and permit evacuation thereof. The gates may be positioned and operated such that feedstock 16 may be moved (e.g., in batches) through the conduit 148 without exposing the gasifier 14 to ambient air.

A gasifier 14 in accordance with the present invention may include a housing 152 forming an exterior thereof. In selected embodiments, a housing 152 may have a substantially cylindrical shape or configuration. A housing 152 may include various sections. The sections may be separable to facilitate assembly, repair, and the like.

In one embodiment, the various sections of a housing 152 may include a base 154, a lower section 156 resting on and extending upward from the base 154, an intermediate section 158 resting on and extending upward from the lower section 156, and an upper section 160 resting on and extending upward from the intermediate section 158. An upper section 160 may include a feedstock inlet 162. A feedstock inlet 162 may be connected to a conveyer system 144 to receive feedstock 16 therefrom. A lower section 156 may include a gas outlet 164 through which the syn-gas is extracted. It may also include a waste outlet 166 through which the waste remaining after the gasification process is expelled from the gasifier 14.

In certain embodiments, a gasifier 14 may include a shaft 168 extending vertically through the housing 152. Rotation of the shaft 168 may cause rotation or motion of various components and contents contained within gasifier 14, promoting effective and efficient operation. One or more motors 170 may be connected and positioned to urge rotation of the shaft 168 about a vertical axis. For example, in one embodiment, a first motor 170a may be positioned proximate an upper end of the shaft 168, while a second motor 170b may be positioned proximate a lower end of the shaft 168. The first motor 170a may urge rotation of a first transmission mechanism 172a, which in turn may urge rotation of the shaft 168. Similarly, the second motor 170b may urge rotation of a second transmission mechanism 172b, which in turn may urge rotation of the shaft 168.

A gasifier 14 may include various ports 173, apertures 173, probes 173 and the like. Such components 173 may support delivery or injection of gases to locations within the gasifier 14. They may also support various wires, sensors, and the like requiring access to the internal workings of a gasifier 14.

In selected embodiments, a gasifier system 138 may include a waste system 174. A waste system 174 may conveyor the waste remaining after the gasification process away from a gasifier 14. In certain embodiments, a waste system 174 may include a motor 176, a conduit 178, and an auger positioned within the conduit 178. The conduit 178 may extend from the gasifier 14 to a container 180 for housing the waste. The motor 176 may urge rotation of the auger within the conduit 178, thereby propelling the waste from one end of the conduit 178 (e.g., the end near the gasifier 14) to the other (e.g., the end near the container 180). In selected embodiments, a container 180 may be mounted on wheels 182, facilitating transport of the waste contained therein.

A gasifier system 138 may include a control system controlling one or more systems (e.g., subsystems) associated with a gasifier system 138. In selected embodiments, the various components of a control system may be housed in a control box 184. In one embodiment, a control box 184 may be secured to a frame 186 supporting a hopper 142. Such an arrangement may provide a gasifier system 138 that is modular in nature and is easily transported.

Figure 5:
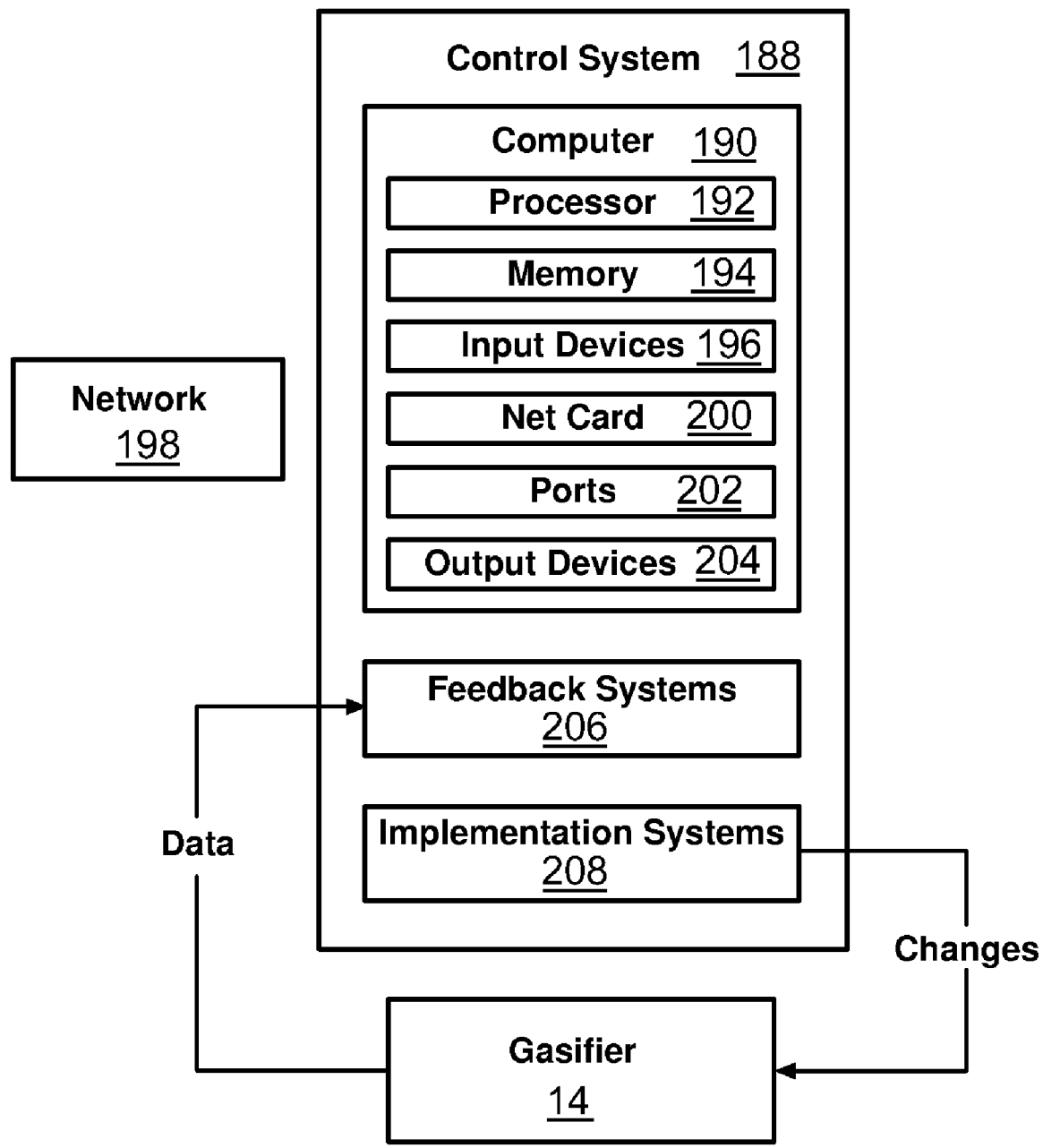
FIG. 5 is a schematic block diagram of a control system in accordance with the present invention.

Referring to FIG. 5, a control system 188 in accordance with the present invention may provide for manual control, automated control, or combined manual and automated control. For example, manual switches may control certain functionality, while programmed logic may control other functionality. Still other functionality may be controlled by automated systems that are not computer based (e.g., fuses, circuit breakers, and the like).

In selected embodiments, a control system 188 may include a computer 190. A computer 190 may include a processor 192 or CPU 192. The CPU 192 may be operably connected to a memory device 194. A memory device 194 may include one or more devices such as a hard drive or other non-volatile storage device, a read-only memory (ROM), and a random access (and usually volatile) memory (RAM or operational memory). Such components 192, 194 may exist in a single node or may exist in multiple nodes remote from one another.

In selected embodiments, a computer 190 may include an input device 196 for receiving inputs from a user or from another device. Input devices may include one or more physical embodiments. For example, a keyboard may be used for interaction with the user, as may a mouse, stylus pad, switch, or button (e.g., emergency stop button). A touch screen, a telephone, or simply a telecommunications line, may be used for communication with other devices, with a user, or the like. Similarly, a scanner may be used to receive graphical inputs, which may or may not be translated to other formats. A hard drive or other memory device may be used as an input device whether resident within the particular node or some other node connected by a network 198. In selected embodiments, a network card 200 (interface card) or port 202 may be provided within a node to facilitate communication through such a network 198.

In certain embodiments, one or more output devices 204 may be provided within a node, or accessible within the computer 190. Output devices 204 may include one or more physical hardware units. For example, in general, one or more ports 202 (e.g., USB ports) may be used to accept inputs into and send outputs from the computer 190. Nevertheless, a monitor may provide outputs to a user for feedback during a process, or for assisting two-way communication between the processor 192 and a user. A printer, a hard drive, buzzer or alarm, lights, or other devices may be used for to output information and may be considered output devices 204 in accordance with the present invention.

Internally, a bus, or plurality of buses, may operably interconnect the processor 192, memory devices 194, input devices 196, output devices 204, network card 200, and ports 202. The bus may be thought of as a data carrier. As such, the bus may be embodied in numerous configurations. Wire, fiber optic line, wireless electromagnetic communications by visible light, infrared, and radio frequencies may likewise be implemented as appropriate for the bus and the network 198.

In general, a network 198 to which a computer 190 connects may, in turn, be connected through a router to another network. In general, various components of a computer 190 may be on the same network, adjoining networks (i.e., network and neighboring network), or may be separated by multiple routers and multiple networks as individual nodes on an internetwork. The individual nodes may have various communication capabilities. In certain embodiments, a minimum of logical capability may be available in any node or computer 190. For example, each node may contain a processor 192 with more or less of the other components described hereinabove.

A network 198 may include one or more servers. Servers may be used to manage, store, communicate, transfer, access, update, and the like, any practical number of files, databases, or the like for other nodes or computers 190 on a network 198. Typically, a server may be accessed by all nodes on a network 198. Nevertheless, other special functions, including communications, applications, directory services, and the like, may be implemented by an individual server or multiple servers.

In general, a node or computer 190 may need to communicate over a network 198 with a server, a router, or other nodes. Similarly, a node may need to communicate over another neighboring network in an internetwork connection with some remote node. Likewise, individual components may need to communicate data with one another. A communication link may exist, in general, between any pair of devices.

One or more software programs running on a computer 190 may control various systems (e.g., subsystems) of a gasifier system 138. The various systems controlled by a control system 188 may largely be divided into two classes, namely feedback systems 206 and implementations systems 208. Through the feedback systems 206, a control system 188 may learn what is happening within the gasifier 14 or other components of the gasifier system 138. Through the implementation systems 208, a control system 188 may effect changes to the operation of the gasifier system 138, sound an alarm, or the like.

Figure 6:
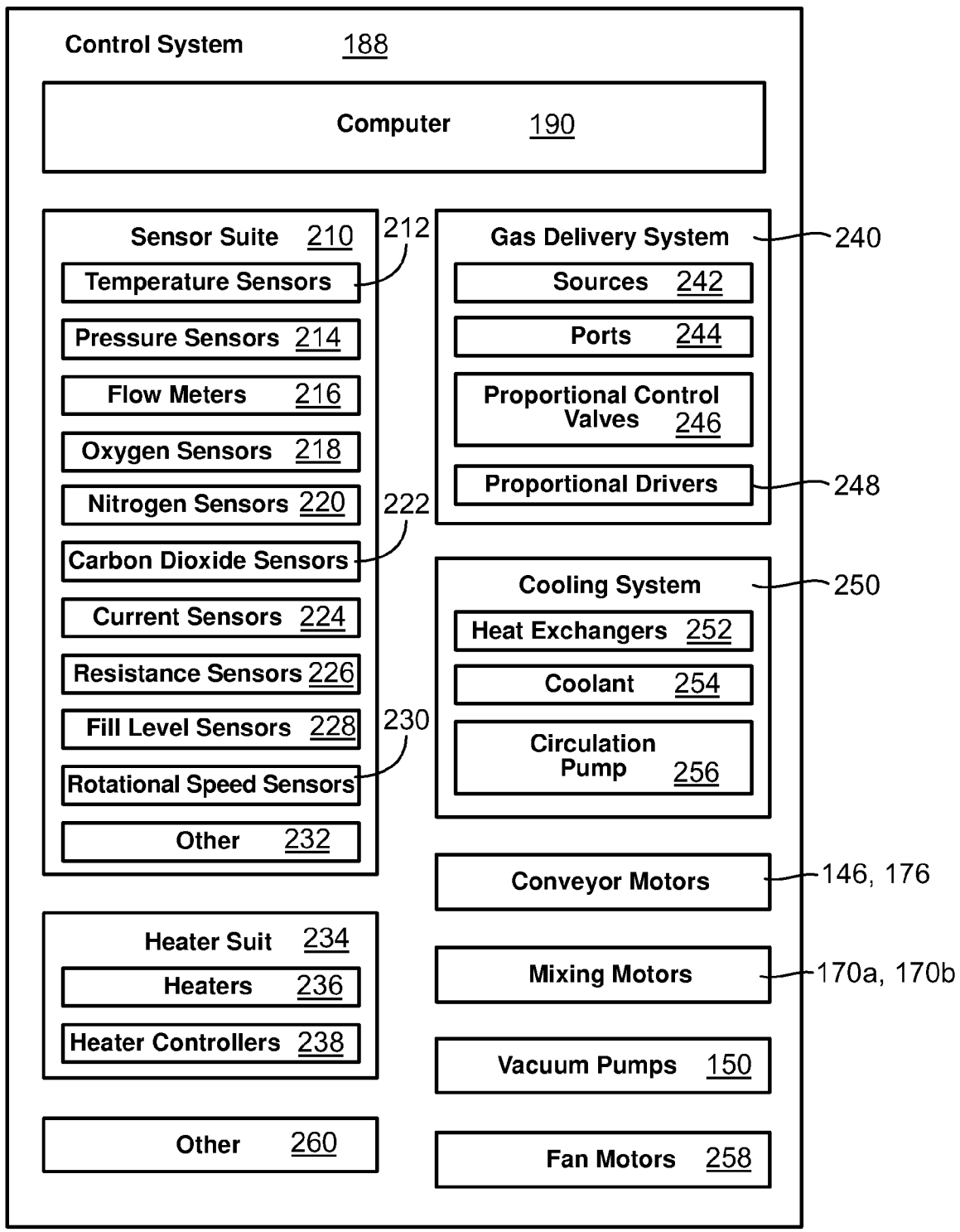
FIG. 6 is a schematic block diagram of the various systems and components that may be included in a control system in accordance with the present invention.

Referring to FIG. 6, in selected embodiment, a sensor suite 210 may be the primary feedback system of a control system 188 in accordance with the present invention. Within a sensor suite 210 may be temperature sensors 212, pressure sensors 214, flow meters 216, oxygen sensors 218, nitrogen sensors 220, carbon dioxide sensors 222, current sensors 224, resistance sensors 226, fill-level sensors 228, rotational speed sensors 230, and the like 232. By closely monitoring the outputs of the various sensors of the sensor suite 210, a control system 188 may implement changes as necessary to maintain the gasifier 14 operating at or near peak efficiency.

In certain embodiments, the core of a sensor suite 210 may be the temperature sensors 212 sensing or measuring the temperature of many locations within a gasifier system 138. In selected embodiments, the temperature sensors 212 may include thermocouples, each outputting a signal or current corresponding to the temperature thereof.

In selected embodiments, pressure sensors 214 may provide feedback on the effectiveness of a vacuum pump 150 by monitoring the pressure in the conduit 148 of a feed system 140, as well as in the upper section of a gasifier 14. Flow meters 216 may measure the flow of gas (e.g., oxygen, oxygen enriched air, air) into a gasifier 12, as well as the flow of gas (e.g., syn-gas) out of a gasifier 14. Oxygen, nitrogen, and carbon dioxide sensors 218, 220, 222 may be positioned to monitor the composition of the air within the upper section 160 or gas outlet 164 of a gasifier 14. Current and resistance sensors 224, 226 (e.g., fuses, breaker switches, etc.) may monitor the electrical characteristics of certain components in an effort to identify problems.

One or more fill-level sensors 228 may be positioned to monitor the flow of material through a gasifier system 138. For example, a fill-level sensor 228 (FIG. 4) may be positioned to monitor the amount of feedstock 16 contained within a hopper 142. A control system 188 may use the data provided by the fill-level sensor 228 to determine when more feedstock 16 should be added to a hopper 142 or when the hopper 142 is full. Similar sensors 228 may be positioned within the upper section 160 of a gasifier 14, within the container 180 of the waste system 174, and the like. Accordingly, a control system 188 may learn when more feedstock 16 needs to be added to a gasifier 14, when a container 180 needs to be emptied, and the like.

In selected embodiments, one or more rotational sensors 230 may monitor the speed of rotation of certain mechanisms such as the shaft 168 extending through the gasifier 14. Accordingly, the control system 188 may ensure that the feedstock 16 and the like with the gasifier 14 are being mixed or agitated sufficiently.

A control system 188 may include a heater suite 234. For example, a control system 188 may include one or more heaters 236 (e.g., electrical resistance heaters 236 converting electrical current into heat). Each such heater 236 may be coupled to a heater controller 238 (e.g., controlling the current delivered to that heater 236). The heaters 236 of a heater suite 234 may be positioned within a gasifier 14 and provide a control system 188 the ability to increase the temperature of specific locations within that gasifier 14.

A control system 188 may include a gas-delivery system 240. In selected embodiments, a gas-delivery system 240 may deliver one or more gasses such as oxygen, oxygen enriched air, air, nitrogen, and the like to a gasifier 14. A gas-delivery system 240 may include one or more sources 242 (e.g., tanks, pumps, or the like) of gas operably connected to ports 244 delivering the gas to specific locations within a gasifier 14. Between a source of gas 242 and a port 244 may be a proportional control valve 246 operating under the direction or control of a proportional driver 248. Accordingly, a control system 188 may proportionally control delivery of gas.

In selected embodiments, a gas-delivery system 240 may perform two functions. The first may be delivery of oxygen to the gasifier 14. If too much is added, temperatures within the gasifier 14 may rise undesirably and the gasifier 14 may support more complete combustion than generation of syn-gas. Conversely, if insufficient oxygen is added, the temperature may decrease and oxygen may become the limiting reactant in the generation of syn-gas.

A second function of a gas-delivery system 240 may be to facilitate shut down (e.g., emergency shut down) of a gasifier 14. In selected embodiments, a gas-delivery system 240 may participate in such processes my cutting off oxygen to the gasifier 14, purging the oxygen from a gasifier 14 by flooding the gasifier 14 with nitrogen (or some other gas that does not support combustion), or some combination thereof. In selected embodiments, a three-way valve may connect a source 242 of combustion-supporting gas or gasses, a source 242 of combustion-stopping gas or gasses, and the various ports 244. Accordingly, operation of the three-way valve may determine whether a gas-delivery system 240 aids combustion or stops it.

In certain embodiments, a control system 188 may include a cooling system 250. A cooling system 252 may remove heat from various structures or flows of a gasifier system 138. For example, a cooling system 252 may include a heat exchanger 252 transferring heat from the syn-gas exiting a gasifier 14 to a coolant 254. In selected embodiments, a cooling system 250 may include a heat exchanger 252 taking the form of a cooling jacket 252 encircling the lower section 156 of a gasifier 14. Coolant 254 may be circulated through the jacket 252 to remove heat from the lower section 156. In selected embodiments, a cooling system 250 may include a circulation pump 256 to circulate the coolant 254.

As set forth hereinabove, a gasifier system 138 in accordance with the present invention may include a feed system 140, waste system 174, and vacuum pump 150. In selected embodiments, these systems 140, 174 and components 150 may be considered part of a control system 188. Specifically, the motive elements thereof (motors 146, 176, 170a, 170b, 150) may operate as part of, or under the direction of, a control system 188.

In selected embodiments, a control system 188 may include one or more fans 258 or fan motors 258. For example, a control system 188 may include a fan 258 for extracting or pumping syn-gas out the gas outlet 164 of a gasifier 14. A control system 188 may also include one or more cooling fans 258 (e.g., fans 258 circulating air through a control box 184 or some subset or portion thereof.

A control system 188 may include other 260 systems as desired or necessary to aid in the efficient and safe operation of a gasifier system 138 in accordance with the present invention.

Figure 7:
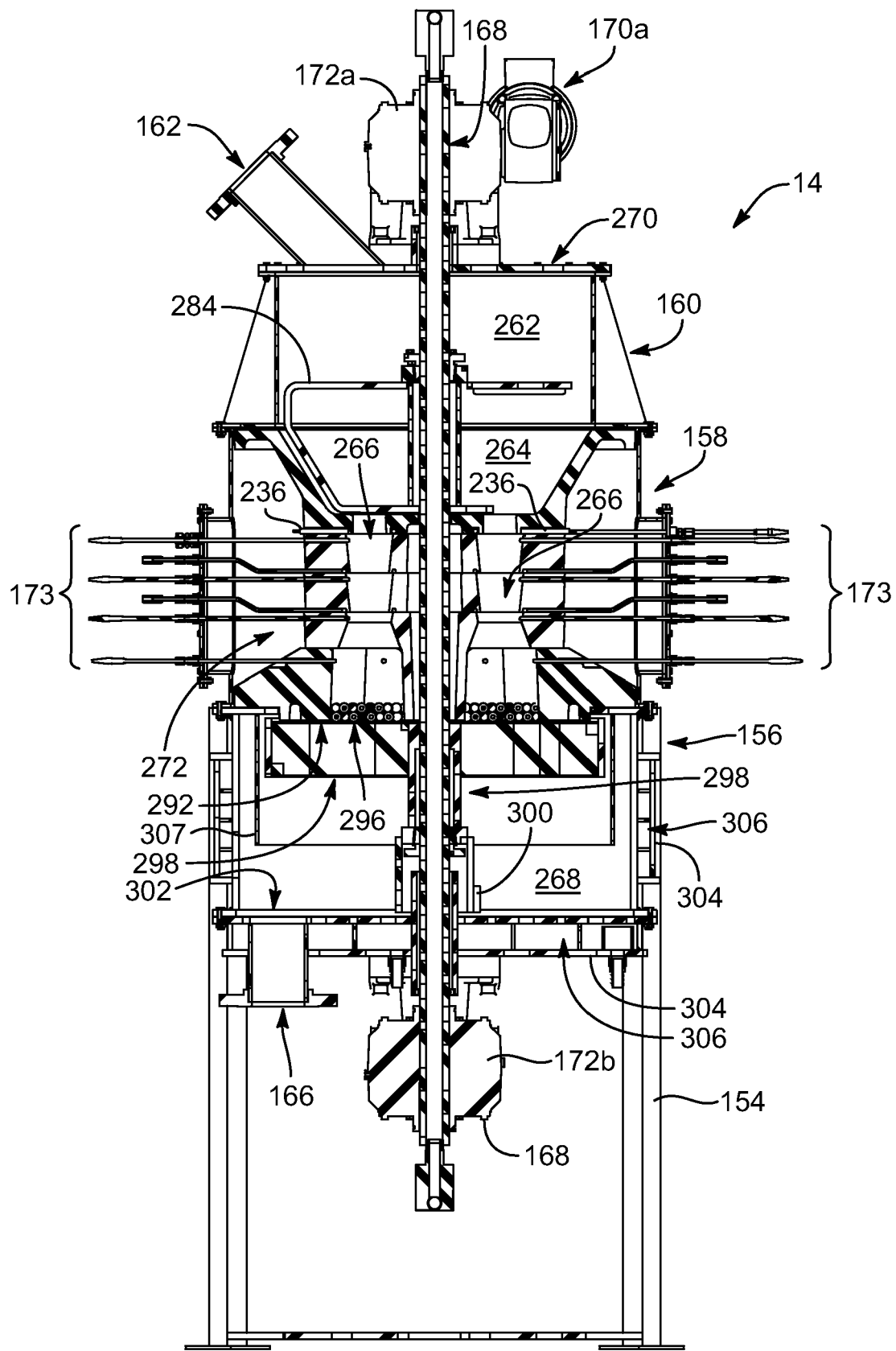
FIG. 7 is a side, cross-sectional view of one embodiment of a gasifier in accordance with the present invention.
Figure 8:
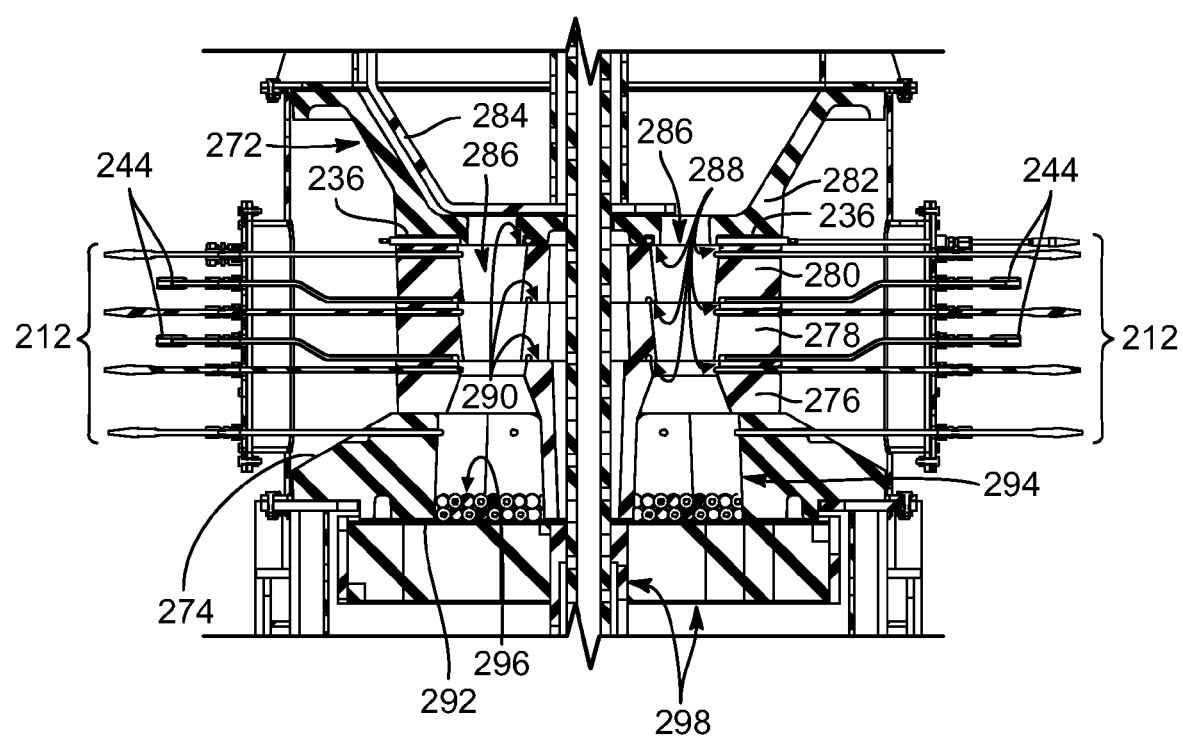
FIG. 8 is a side, cross-sectional view of the intermediate section of the gasifier of FIG. 7.

Referring to FIGS. 7 and 8, in selected embodiments, a gasifier 14 in accordance with the present invention may be a downdraft gasifier 14. Accordingly, the general flow of gases in the gasifier 14 may be downward.

A gasifier 14 may heat feedstock 16 (e.g., pre-processed feedstock) to a temperature where it is converted to syn-gas. Feedstock 16 may enter through a feedstock inlet 162 and travel down through the gasifier 14 toward a waste outlet 166. A fan 258 may draw hot syn-gas out of the gasifier 14 through the gas outlet 164. The fan 258 may further propel the syn-gas into a cyclone separator and one or more heat exchangers 252. A heat exchanger 252 may harvest the heat from the gasifier 14 and use it to make steam for driving a turbine 112. The cyclone separator may separate the syn-gas from any ash that it may be carrying that was not removed by the slag forming proximate the lower portions of a gasifier 14.

In selected embodiments, a gasifier 14 in accordance with the present invention may include four zones that function in unison to simultaneously process the feedstock 16 and generate clean syn-gas. These zones are the drying zone 262, tar-formation zone 264, oxidation zone 266, and reduction zone. In a drying zone 262, the feedstock 16 is stored for consumption. Also, heat radiating upward from a lower, oxidation zone 266 may drive off the residual moisture as water vapor. The water vapor may participate in the chemical reactions in the reduction zone when carbon reacts with the water vapor to generate carbon monoxide and hydrogen ($H_2$), the desired output.

Because the tar-formation zone 264 is closer to the oxidation zone 266 than the drying zone 262, the temperature within a tar-formation zone 264 may be higher than that within the drying zone 262. In the tar-formation zone 264, the feedstock 16 may be heated without oxygen to produce oil, tar, char, and charcoal. These products may provide a ready supply of carbon for the chemical reactions that later occur in the reduction zone.

In the oxidation zone 266, all or part of the volatile materials may be oxidized to generate the heat for the chemical reactions of the process. At the conclusion of the oxidation zone 266 or as the material passes out of the oxidation zone 266, approximately 20% to 30% of the organic material may have been oxidized and the oxygen is typically consumed. Accordingly, there is typically no flame in the succeeding, reduction zone. Some combustible gases may be generated in the oxidation zone 266.

In the reduction zone, the hot gases generated in the oxidation zone 266 may react with the carbonaceous material generated in the tar-formation zone 264 to convert most of the material to syn-gas, which comprises primarily carbon monoxide and hydrogen. During these reactions the sensible heat or heats of the chemical reactions are converted into chemical energy for the syn-gas. This, being endothermic, may result in cooling of the mass to below 800° C., which effectively stops the chemical processes and no further syn-gas is typically formed thereafter.

In the high temperatures of this process, the residual inert ash melts to a molten slag. This slag may impart a scrubbing and filtering action on the syn-gas produced. This may strip the gas of most all of the impurities and solid particles. The binders incorporated during preprocessing of the feedstock 16 may trap pollutants within the slag. The slag may have the consistency of sand and may be safely used as an aggregate or deposited in a landfill. For this reason the syn-gas generated within a gasifier 14 in accordance with the present invention may be used directly without "hot gas cleanup."

In selected embodiments, a gasifier 14 may include an enclosed top 270. The enclosed top 270 may stop all or some portion of the atmospheric nitrogen from entering a gasifier 14 and generating undesirable compounds. Also, the enclosed top 270 may assist in maintaining the desired temperatures within the gasifier 270. In certain embodiments, the top 270 of a gasifier 14 may include one or more pressure relief valves or vents to prevent excessive pressurization of the gasifier 14.

In certain embodiments, a refractory stack 272 may be housed within the intermediate section 158 of a gasifier 14. A refractory stack 272 may be formed as a single, monolithic unit. Alternatively, a refractory stack 272 may include a plurality of sections. In selected embodiments, a refractory stack 272 or the various sections thereof may be formed of a heat resistant material. For example, they may be formed of ceramic or refractory.

A refractory stack 272 may improve the heat retention, durability, and life span of a gasifier 14. The various sections forming a refractory stack 272 may be replaced as needed, without requiring the replacement of the remaining structures of the gasifier 14. Accordingly, the housing 152 of a gasifier 14 in accordance with the present invention may be formed in separable horizontal sections 154, 156, 158, 160, facilitating access to the refractory stack 272 (and other internal components) of a gasifier 14. In certain embodiments, the housing 152 of a gasifier 14 may also include separable vertical sections in the oxidation and reduction zones, further facilitating maintenance or replacement of the sections of a refractory stack 272.

The number of sections in a refractory stack 272 may vary between embodiments. In one embodiment, a refractory stack 272 may include five sections, namely, a lower manifold 274, a lower intermediate section 276, a middle intermediate section 278, an upper intermediate section 280, and an upper manifold 282. The lower intermediate section 276 may rest on and extend upward from the lower manifold 274. The middle intermediate section 278 may rest on and extend upward from the lower intermediate section 276. The upper intermediate section 280 may rest on and extend upward from the middle intermediate section 278. The upper manifold 282 may rest on and extend upward from the upper intermediate section 280. The interior of an upper manifold 282 may define the tar-formation zone 264. The interior of a lower manifold 274 may define the reduction zone.

A shaft 168 in accordance with the present invention may be formed of any suitable material. Suitable materials may include metals, ceramics, and the like. In one embodiment, a shaft 168 may form a conduit. Coolant 254 from a cooling system 250 may be circulated through the shaft 168 to maintain the shaft 168 within an acceptable temperature range.

In certain alternative embodiments, a gasifier 14 in accordance with the present invention may include two independent center shafts 168. One may extend down from the top of the gasifier 168, while the other extends, coaxially therewith, up from the bottom. Each shaft 168 may be driven by a different motor 170a, 170b. Accordingly, the shafts 168 may be rotated at different speeds, facilitating independent optimization of the mixing within the upper portions 160, 282 of a gasifier 14 and the agitation within the lower portions 156, 274 of the gasifier 14. Also, in such an embodiment, neither shaft 168 may extend through the oxidation zone 266, the hottest portion of the gasifier 14. This may permit the shafts 168 to be formed of materials having less tolerance to heat, which may be less expensive and more readily available.

In selected embodiments, a gasifier 14 may include a mixing blade 284 connected to rotate with the shaft 168. In one embodiment, a mixing blade 284 may be positioned within both the upper section 160 and the upper manifold 282. Accordingly, as the shaft 168 rotates about a vertical axis, the mixing blade 284 may mix the contents (e.g., pre-processed feedstock) of the upper section 160 and upper manifold 282. This mixing may improve the distribution of heat rising from the oxidation zone 266, thereby improving the drying and tar formation effects. In selected embodiments, the mixing blade 284 may scrape the contents of the upper manifold 282 away from an interior surface thereof. This may remove any dead or stagnant zones where the feedstock 16 may collect and not continue on down to the oxidation zone 266.

Certain sections of a refractory stack 272 may include multiple apertures extending vertically therethrough. For example, in one embodiment, the lower intermediate, middle intermediate, upper intermediate, and upper manifold sections 276, 278, 280, 282 may each include multiple apertures extending vertically therethrough. In selected embodiments, these apertures may be aligned between the various section 276, 278, 280, 282 to form multiple columnar cavities 286. Each columnar cavity 286 may extend from the upper manifold 282 to the lower manifold 274, placing the upper manifold 282 in communication with the lower manifold 274.

Each columnar cavity 286 of a gasifier 14 in accordance with the present invention may act as an independent oxidation zone 266. Accordingly, a gasifier 14 may provide parallel paths for feedstock 16 passing therethrough. Furthermore, each columnar cavity 286 may have a width that is less than its height. For example, in selected embodiments, a columnar cavity 286 in accordance with the present invention may have an aspect ratio (i.e. width divided by height) of about 0.40 to about 0.22. This may increase the time the feedstock 16 spends in the oxidation zone 266, increasing the amount of oxidation that occurs. Moreover, each columnar cavity 286 may have a dedicated heater 236, dedicated gas ports 244, and dedicated temperature sensors 212.

These heaters 236, ports 244, and sensors 212 may be positioned within or proximate the apertures defining the columnar cavities 266. Thus, the narrowness of the cavities 266 and the positioning of the heaters 236, ports 244, and sensors 212 may shorten the distance between feedback systems 206, implementation systems 208, and the feedstock 16. Accordingly, a control system 188 may individually, rapidly, and precisely control the environment within each columnar cavity 266.

In selected embodiments, the various apertures in the various sections 276, 278, 280, 282 that align to form the columnar cavities 286 may not be exactly cylindrical. For example, the apertures in selected sections 278, 280 may be conical in shape, converging somewhat when viewed with respect to the downward flow of the feedstock 16. In another section 276, the apertures may converge then diverge.

Apertures so configured may perform two functions. First, they may cumulatively create a columnar cavity 286 that varies in width along its height. This may induce some motion or agitation within the feedstock 16 as is moves down through the cavity 286. Additionally, apertures so configured may create one or more lips 288 or overhangs 288 within the columnar cavities 286.

In selected embodiments, these overhangs 288 may extend the circumference of the cavities 286. Tucked on the underside of the overhangs 288 may be grooves 290. These grooves 290 may also extend the circumference of the cavities 286. The grooves 290 may be completely exposed, partial exposed, or substantially covered by the section 276, 278, 280 positioned immediately therebelow. Certain grooves 290 (e.g., those that are partially exposed or substantially covered) may be used as distribution channels, distributing the gas delivered by a port 244 around a circumference of a cavity 286. Others 290 may house and protect a heater 236. Accordingly, a heater 236 (e.g., resistance heater 236) may extend circumferentially around a columnar cavity 286.

In certain embodiments, heaters 236 may be positioned proximate the upper portions of a columnar cavity 286. The heaters 236 may provide greater control in initiating and automating the gasification process. Additionally, the heaters 236 may reduce the amount of time required to bring a gasifier 14 into optimal production.

That is, gasifiers 14 often emit the most pollution (e.g., "dirtiest" syn-gas) at startup, before the temperatures of the different zones 262, 264, 266 have reached their target ranges. Adding heaters 236 may provide sources of heat that are independent of the combustion of the feedstock 16 and completely within the control of a control system 14. Thus, the amount of time spent emitting the startup flair may be minimized. Additionally, in selected embodiments, a catalytic oxidizer may be applied to the exhaust of a startup flair. This may ensure that undesirable products do not escape the gasifier 14 before it is running in its optimal, efficient, and "clean" temperatures.

In selected embodiments, a grate 292 may be positioned within a gasifier 14 to form the bottom boundary of the reduction zone. In one embodiments, a grate 292 may be positioned proximate the underside of a lower manifold 274. A lower manifold may include an aperture 294 extending vertically therethrough. The aperture 294 may have an undulating perimeter (e.g., a perimeter that varies in and out in a radial direction along a path extending in a circumferential direction). A plurality of balls 296 (e.g., ceramic balls about ½ inch in diameter) may be supported by the grate 292 and held by the grate 292 within the aperture 294 of the lower manifold 274.

A grate 292 may be supported and held in position by a grate support 298. A grate support 298 may be connected to rotate with a shaft 168. Rotation of the grate support 298 may result in rotation of the grate 292, which in turn may result in rotation of the balls 296. Because an aperture 294 having an undulating perimeter laterally contains the balls 296, relative rotation between the balls and the aperture may result in agitation or mixing of the balls 296. The resultant bed of moving and mixing balls 296 may provide a semi permeable barrier, permitting syn-gas and small particles to work their way through, while blocking the passage of larger particles. Thus, only feedstock 16 that has been sufficiently oxidized and reduced may exit the reduction zone.

In selected embodiments, vibrators (e.g., magnetic vibrators) may be applied to agitate a grate 292 within a gasifier 14. The vibrators may facilitate and improve flow through the gasifier 14. Additionally, a grate 292 may be formed with various apertures extending therethrough. The balls 296 may be deposited on top of the grate. The vibrators may prevent the balls 296 from settling into and blocking the apertures in the grate 292.

In certain embodiments, a gasifier 14 may include one or more wiper blades 300 positioned with the lower section 156. A wiper blade 300 may be connected to rotate with the shaft 168. In one embodiment, one or more wiper blades 300 may be formed as part of, or be connected to, a grate support 298. Accordingly, as the grate support 298 rotates, so may one or more wiper blades 300. A wiper blade 300 may urge the contents of the lower section 156 toward the ash outlet 166. In selected embodiments, one or more wiper blades 300 may rotate across (e.g., scrap) the floor 302 of a lower section 156.

A second wall 304 applied to the lower section 156 of a gasifier 14 may form a heat exchanger 252 or cooling jacket 252. Coolant 254 circulated through the interior cavities 306 formed by the second wall 304 may remove heat from the lower section 156 and its contents. Accordingly, the temperature within the lower section 156 may be controlled to protect the material forming the lower section 156 from overheating, prepare the residue for disposal, or the like.

A lower section 156 in accordance with the present invention may include a separation wall 307. A separation wall 307 may provide a barrier between particles falling through a grate 292 and a gas outlet 164. This may reduce the number of particles that leave the lower section 156 entrained within the syn-gas.

Figure 9:
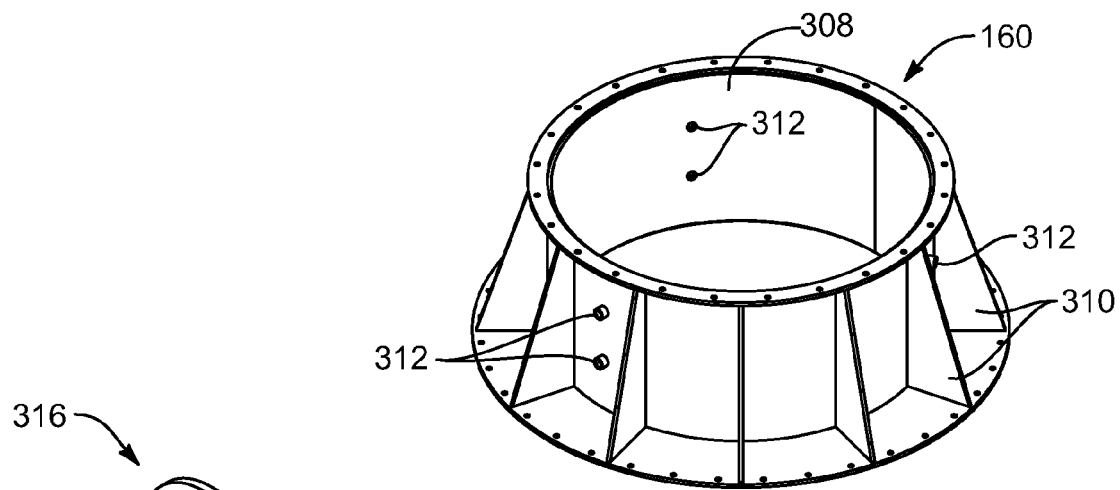
FIG. 9 is a perspective view of one embodiment of an upper section of a gasifier in accordance with the present invention.

Referring to FIG. 9, the upper section 160 of a gasifier 14 in accordance with the present invention may be formed of any suitable material in any suitable manner. In selected embodiments, an upper section 160 may be formed of metal and include a tubular structure 308 supported by external ribs 310. The tubular structure 308 may include one or more apertures 312 permitting entrance of sensors, feeds, or the like into the upper section 160. In one embodiment, six sensors 212 may each monitor a different zone within the upper section 160. One or more oxygen sensors 218, nitrogen sensors 220, and carbon dioxide sensors 222 may also monitor the contents of the upper section 160.

Figure 10:
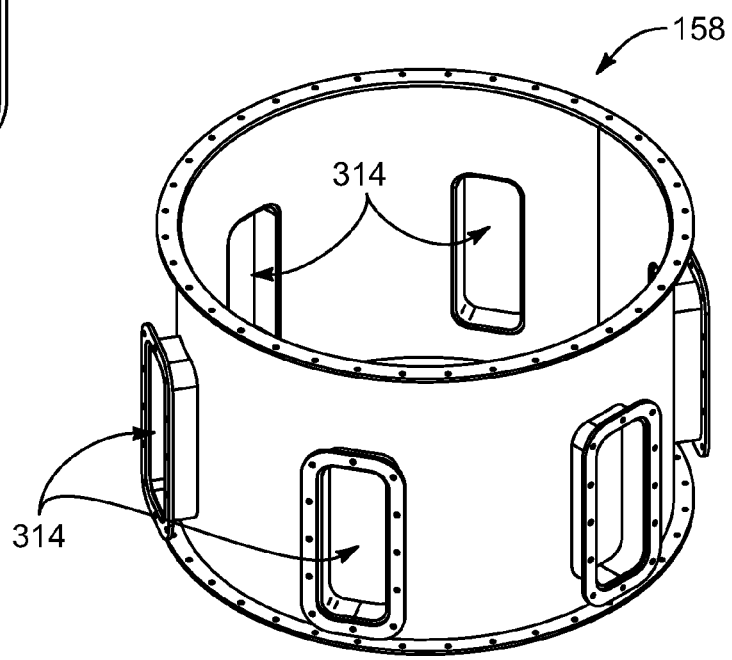
FIG. 10 is a perspective view of one embodiment of an intermediate section of a gasifier in accordance with the present invention.

Referring to FIG. 10, an intermediate section 158 may be formed of any suitable material. In selected embodiments, an intermediate section 158 may be formed as a tubular metal construct. Various apertures 314 may extend through the intermediate section 158. Such apertures 314 may provide locations for sensors 210, sensors wires, and the like to enter the intermediate section 158. In one embodiment, an intermediate section 158 may include one aperture 314 for each columnar cavity 286 of the refractory stack 272 to be housed therein.

Figure 11:
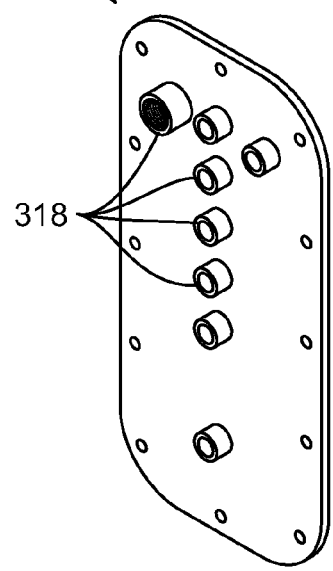
FIG. 11 is a perspective view of one embodiment of an aperture cover for the intermediate section of FIG. 10.

Referring to FIG. 11, in selected embodiment, an aperture cover 316 may be applied to each aperture 314 extending through an intermediate section 158. An aperture cover 316 itself may include one or more apertures 318 or ports 318 for receiving, securing, and sealing around one or more sensors 210, sensors wires, and the like. In one embodiment, the apertures 318 in an aperture cover 316 may accommodate or secure one heater 236, one heater temperature sensor 212 monitoring the temperature at or near the heater 236, four cavity temperature sensors 212 (each corresponding to a different section 274, 276, 278, 280 of a particular columnar cavity 286), and two gas-delivery ports 244 (each corresponding to a different section 278, 280 of a particular columnar cavity 286).

Figure 12:
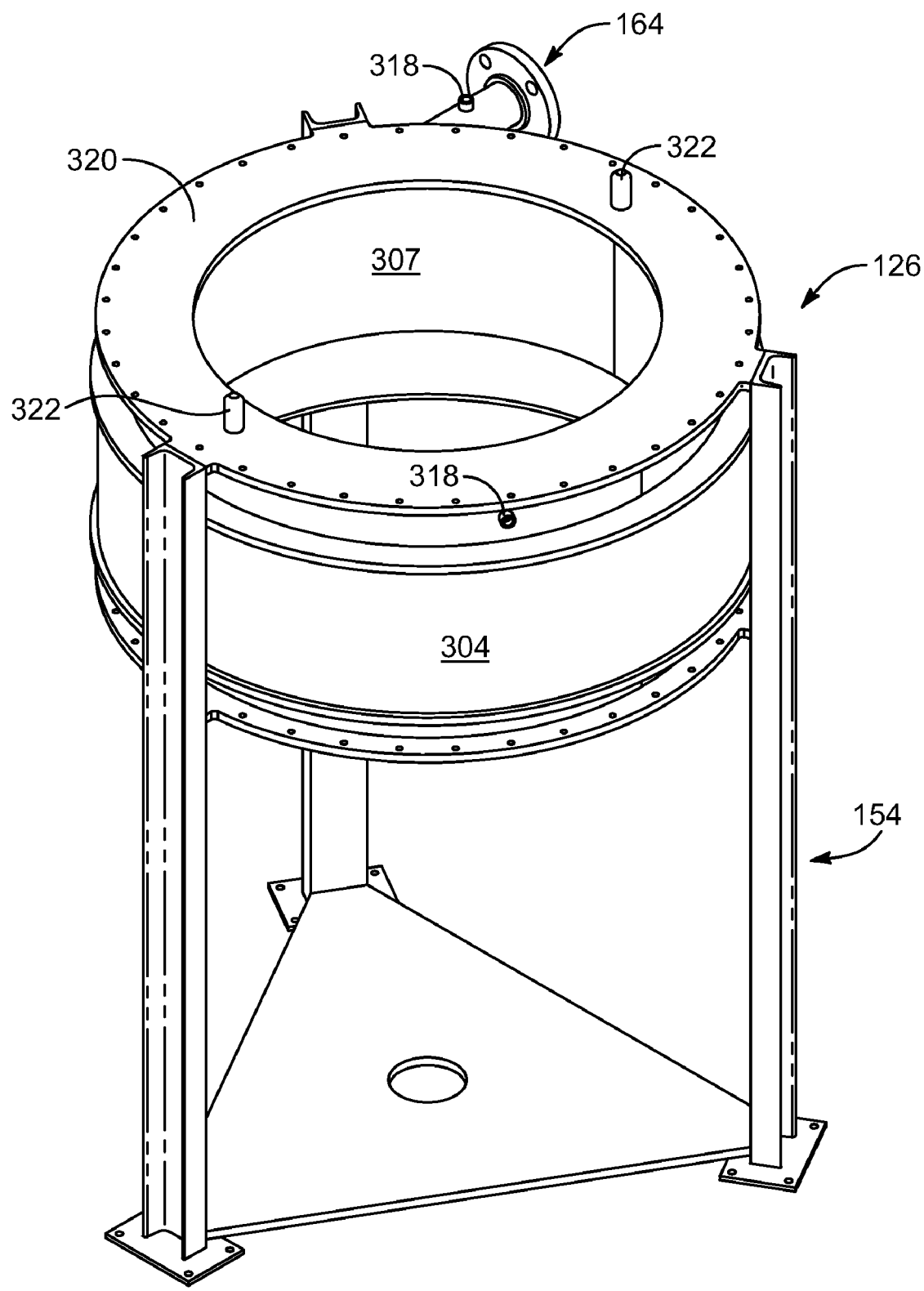
FIG. 12 is a perspective view of one embodiment of a base and lower section of a gasifier in accordance with the present invention.

Referring to FIG. 12, a lower section 156 may secure to a base 154. In selected embodiments, a lower section 156 may include one or more apertures 318 or ports 318 for receiving, securing, and sealing around one or more sensors 210, sensors wires, and the like. For example, in one embodiment, a lower section 156 may include three ports 318 spaced circumferentially around an upper portion of the lower section 156. Sensors 212 placed at those locations may monitor the temperate of the gas exiting the reduction zone. One or more apertures 318 or ports 318 may be positioned proximate a gas outlet 164, providing a location for securing a temperature sensor 212, flow meter 216, oxygen sensor 218, and the like.

In certain embodiments, a lower section 156 may include an upper plate 320 extending circumferentially around the top of thereof. When assembled, the upper plate 320 may provide the vertical support for the refractory stack 272. In one embodiment, one or more alignment pins 322 may extend upward from the upper plate 320. These pins 322 may be inserted within corresponding apertures within the lower manifold 274, thereby ensuring a proper alignment. In selected embodiments, the pins 322 may have internal apertures that are threaded to receive a threaded rod, clamping the refractory stack 272 together and down against the upper plate 320.

Figure 13:
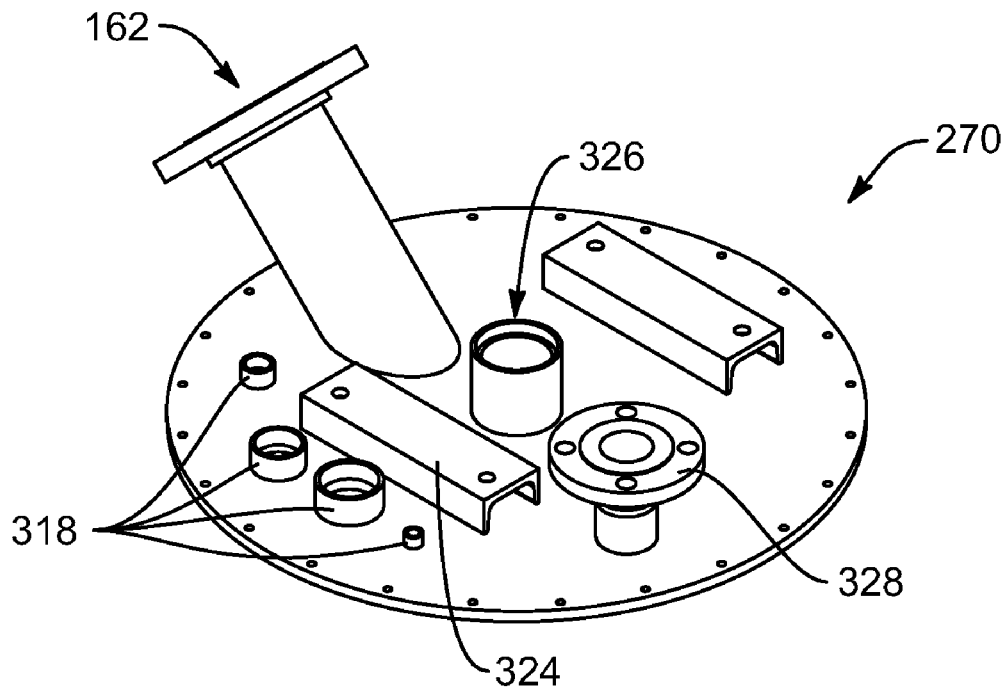
FIG. 13 is a perspective view of one embodiment of a top of a gasifier in accordance with the present invention.

Referring to FIG. 13, a top 270 of a gasifier 14 may be formed of any suitable material in any suitable manner. In selected embodiments, a top 270 may include one or more mounts 324 for receiving and securing a transmission mechanism 172 or motor 170. A top 270 may also include a shaft mount 326 for securing or locating a shaft 168. A top 270 may also include one or more apertures 318 or ports 318 for receiving, securing, and sealing one or more sensors 210 (e.g., pressure sensors 214, oxygen sensors 218, nitrogen sensors 220, carbon dioxide sensors 222, and the like). In one embodiment, a top 270 may include a connector 328 for passing gas in or out of a gasifier 14. For example, in one embodiment, a connector 328 may be a location for nitrogen (or some other non-combustion support gas) infusion into a gasifier 14. Alternatively, a connector 328 may provide a location for securing a pressure release valve.

Figure 14:
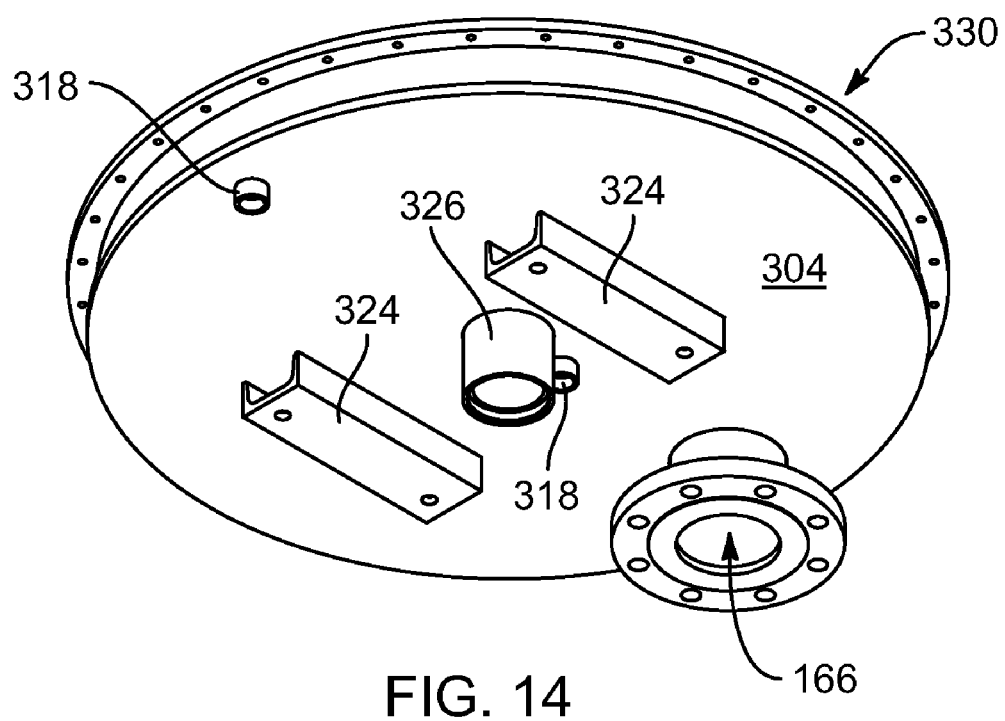
FIG. 14 is a perspective view of one embodiment of a bottom of a gasifier in accordance with the present invention.

Referring to FIG. 14, in selected embodiments, a gasifier 14 may include a bottom 330 secured at the lower portion or extreme of a lower section 156. In selected embodiments, a bottom 330 may include a waste outlet 166, one or more apertures 318 or ports 318 for receiving, securing, and sealing sensors 210 or the like, one or more mounts 324 for receiving and securing a transmission mechanism 172 or motor 170, a shaft mount 326 for securing or locating a shaft 168, and the like.

Figure 15:
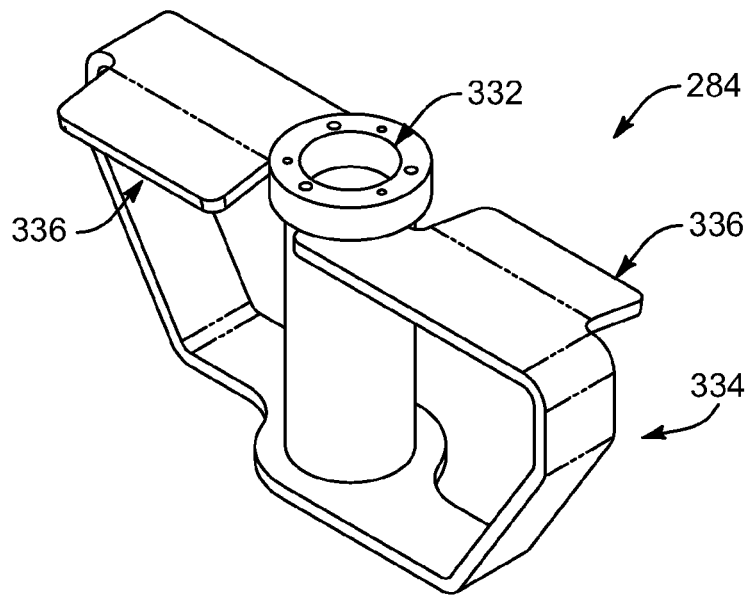
FIG. 15 is a perspective view of one embodiment of a mixing blade in accordance with the present invention.

Referring to FIG. 15, a mixing blade 284 in accordance with the present invention may be formed of any suitable material. In selected embodiments, a mixing blade 284 may be formed of metal. A mixing blade 284 may include an aperture 332 for receiving a shaft 168 therethrough. A mixing blade 284 may also include a perimeter 334 contoured to match the shape of the container (e.g., upper section 160, upper manifold 282) in which it will rotate, thereby ensuring efficient and complete mixing. In selected embodiments, a mixing blade 284 may also include one or more deflectors 336 to increase or enhance the mixing effect produced.

Figures 16, 17:
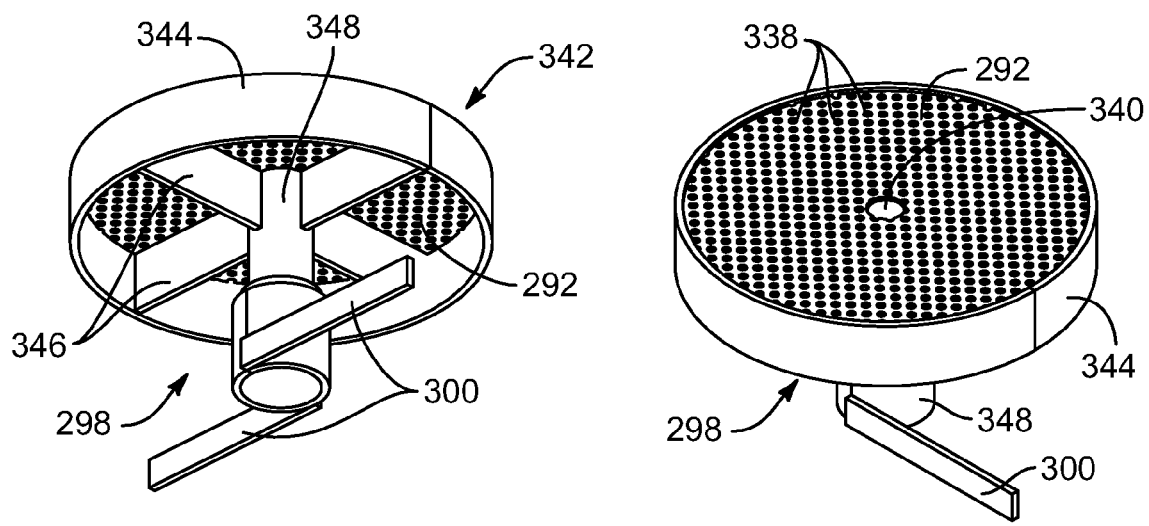
FIG. 16 is a top, perspective view of one embodiment of a grate and grate support in accordance with the present invention.
FIG. 17 is a bottom, perspective view of the grate and grate support of FIG. 16.

Referring to FIGS. 16 and 17, in selected embodiments, a grate 292 may include a plurality of apertures 338 extending vertically therethrough. The apertures 338 may be sized smaller than the balls 296 that may be supported by the grate 292. In one embodiment, the apertures 338 may be circular. A grate 292 may also include an aperture 340 for receiving a shaft 168 therethrough.

In selected embodiments, a grate support 298 may include a platform 342. In one embodiment, a platform 342 may include a circumferentially extending rim 344 connected to radially extending ribs 346. The ribs 346 may be connected to a central column 348. A column 348 may provide a shield for a shaft 168 extending therethrough against the contents of the lower section 156 of a gasifier 14. A column 348 may also space the platform 342 a desired distance from the floor 302 of a lower section 156. In selected embodiments, one or more wiper blades 300 may connect to the lower portion of a column 348 and extend substantially radially away therefrom.

Figure 18:
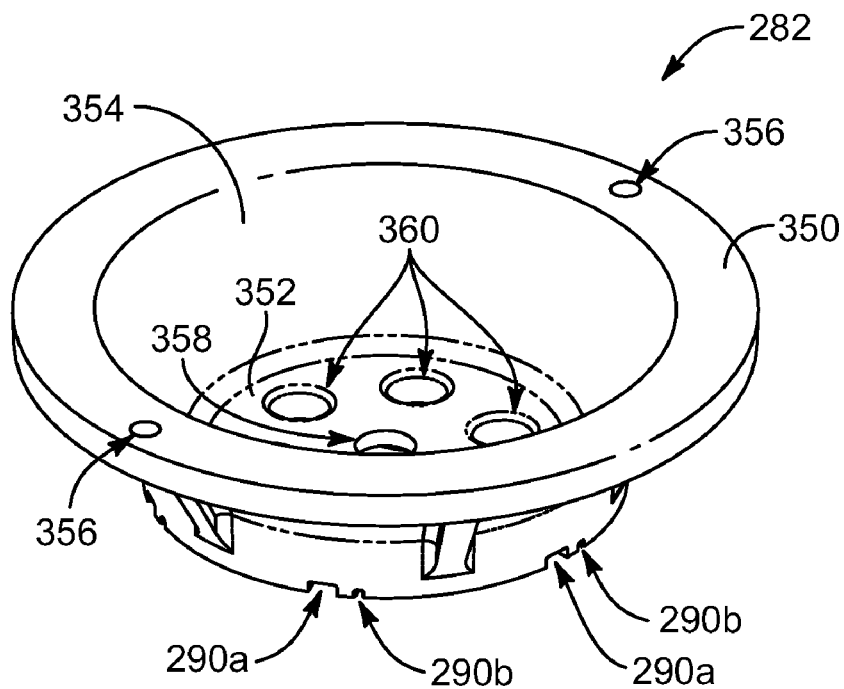
FIG. 18 is a top, perspective view of one embodiment of an upper manifold of a refractory stack in accordance with the present invention.
Figure 19:
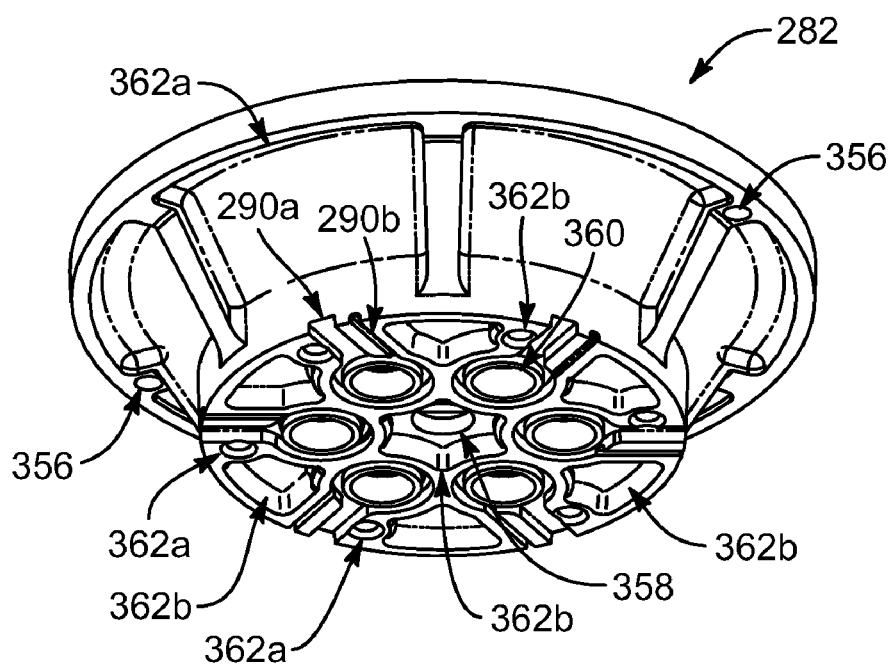
FIG. 19 is a bottom, perspective view of the upper manifold of FIG. 18.

Referring to FIGS. 18 and 19, a gasifier 14 in accordance with the present invention may be scaled to provide a desired throughput. A refractory stack 272 may also be scaled to provide a desired throughput. Additionally, the various components 274, 276, 278, 280, 282 may be sized to support fabrication in a ceramic or refractory material. The number of columnar cavities 286 may vary with the size of a refractory stack 272. In general, the larger (e.g., wider) the stack 272, the more columnar cavities 286 may be included.

In certain embodiments, an upper manifold 282 in accordance with the present invention may include an upper rim 350, a base plate 352, and a sidewall 354 converging somewhat as it extends from the upper rim 350 to the base plate 352. An upper rim 350 may include one or more apertures 356 extending vertically therethrough. The apertures 356 may be configured to align with and engage pins extending downward from a lower portion of an upper section 160. Alternatively, the apertures 356 may receive a threaded rod extending to engage the pins 322 on a lower section 156, clamping the refractory stack 272 together and down against the upper plate 320 of the lower section 156.

In selected embodiments, a base plate 352 may include multiple apertures 358, 360 extending vertically therethrough. One aperture 358 may be centrally located and sized to receive a shaft 168 extending therethrough. The other apertures 360 may form part of the various columnar cavities 286.

The underside of a base plate 352 may include various grooves 290. For example, the underside of a base plate 352 may include grooves 290a for receiving heaters 236 therein. The grooves 290a may extend around the circumference of the apertures 360. Accordingly, heaters 236 placed within such grooves 290a may distribute heat circumferentially around a columnar cavity 286. Other grooves 290b may provide locations for temperature sensors 212 to extend and monitor the temperature of corresponding heaters 236.

The underside of a base plate 352 may also include various recesses 362. Selected recesses 362a may be sized and positioned to engage extensions extending from a neighboring section 280. Accordingly, such recesses 362a may provide a mechanism for aligning the various sections 274, 276, 278, 280, 282 of a refractory stack 272. Other recesses 362b may be simply be hallowed out portions of various shapes. Such recesses 362b may lower the amount of material required to form the section 274, 276, 278, 280, 282, reduce the weight of the section 274, 276, 278, 280, 282, reduce the thermal mass of the section 274, 276, 278, 280, 282, or the like. In selected embodiments, the exterior of a sidewall 354 may also include recesses 362b for material savings, weight savings, and a reduction in thermal mass.

Figure 20:
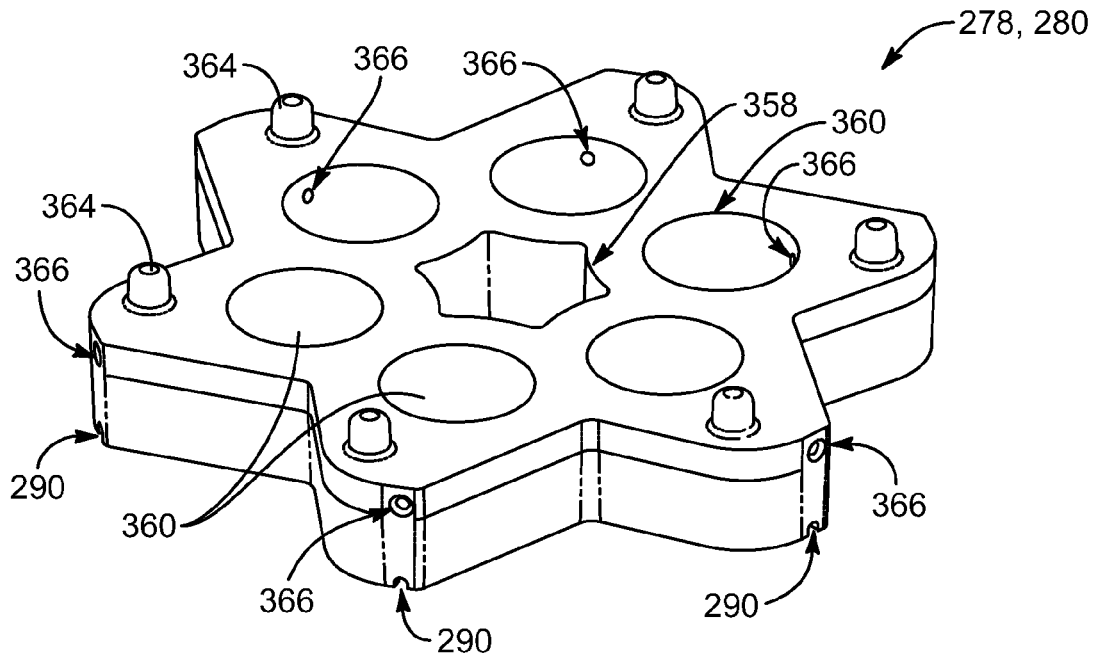
FIG. 20 is a top, perspective view of one embodiment of an intermediate section of a refractory stack in accordance with the present invention.
Figure 21:
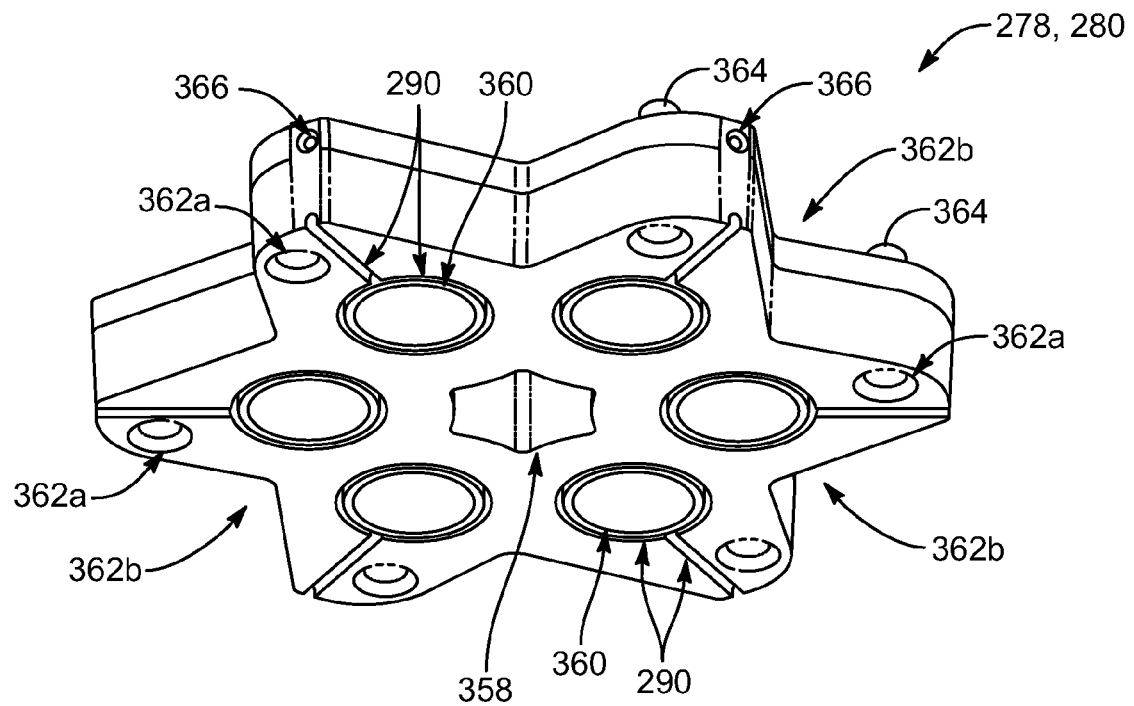
FIG. 21 is a bottom, perspective view of the intermediate section of FIG. 20.

Referring to FIGS. 20 and 21, in selected embodiments, a refractory stack 272 may include repeated sections 278, 280. That is, a refractory stack 272 may include sections 278, 280 that are substantially identical to one another. For example, in the illustrated embodiment, the middle intermediate section 278 and the upper intermediate section 280 of a refractory stack 272 are substantially identical. In certain embodiments, repeating sections 278, 280 may be added or taken away to increase or decrease, respectively, the length of the columnar cavities 286 and, therefore, the corresponding oxidations zones 266. Additionally, use of repeated section 278, 280 may lower manufacturing costs and reduce part inventories.

A section 274, 276, 278, 280 in accordance with the present invention may include one or more extensions 364 extending upward therefrom. Such extensions 364 may be sized and positioned to engage corresponding recesses 362a located in an underside of neighboring sections 276, 278, 280, 282. A section 278, 280 may also include multiple grooves 290 extending from the perimeter to encircle an aperture 360. In selected embodiments, such grooves 290 may facilitate delivery and distribution of gas to a corresponding columnar cavity 286.

In selected embodiments, the perimeter of a section 278, 280 in accordance with the present invention may be substantially circular. Alternatively, the perimeter may include periodic recesses 364b and take on a star-like shape. Similarly, in some embodiments, a shaft aperture 358 may be circular. Alternatively, in other embodiments, a shaft aperture 358 may be somewhat star-shaped. Such as shape may reduce material usage, reduce weight, lower thermal mass, and reduce the rate of heat transfer between the section 274, 276, 278, 280, 282 and the shaft 168.

In certain embodiments, an aperture 366 may extend from the perimeter of a section 274, 276, 278, 280 radially inward to intersect with an aperture 360 forming part of a columnar cavity 286. Such an aperture 366 may provide a sensor (e.g., a temperature sensor 212) access to the columnar cavity 286.

Figure 22:
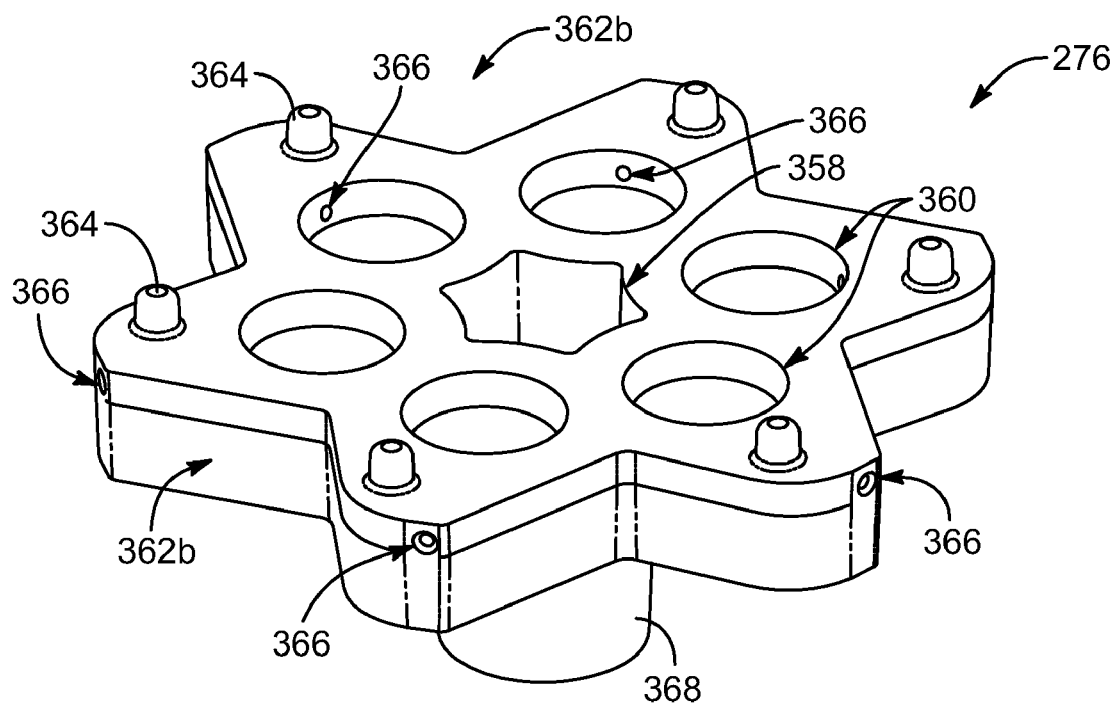
FIG. 22 is a top, perspective view of one embodiment of a lower intermediate section of a refractory stack in accordance with the present invention.
Figure 23:
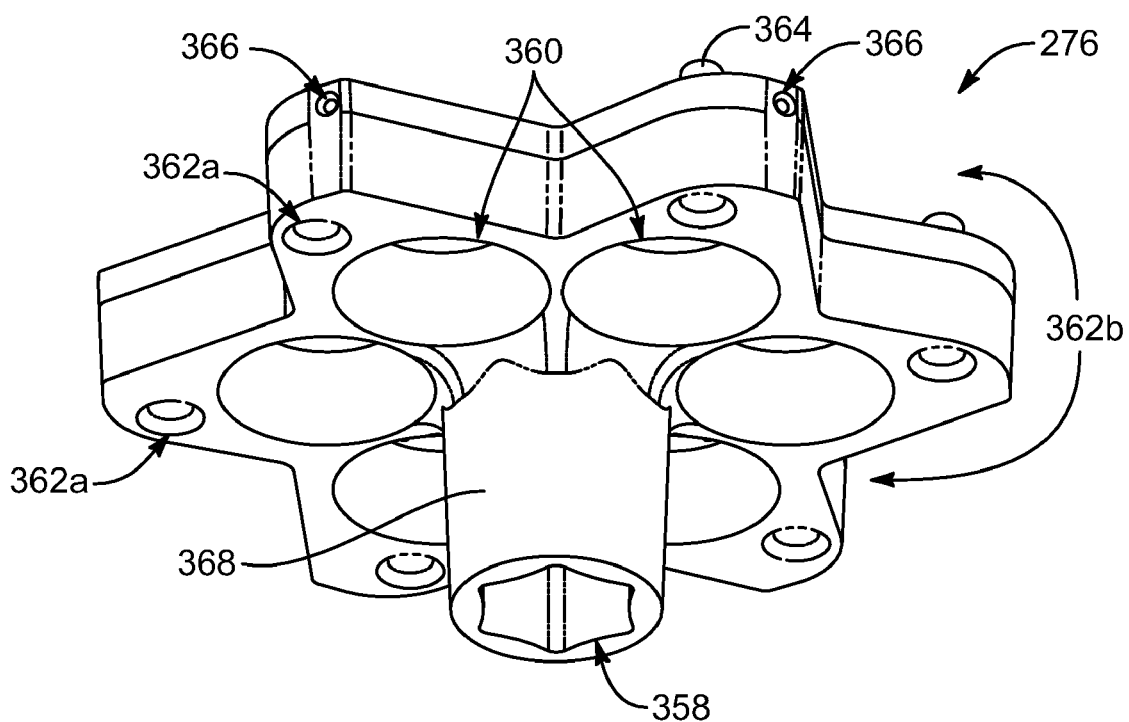
FIG. 23 is a bottom, perspective view of the lower intermediate section of FIG. 22.

Referring to FIGS. 22 and 23, in selected embodiments, the apertures 360 extending vertically through a lower intermediate section 276 of a refractory stack 272 may have a cross-section that varies along the length of the aperture 360. For example, in one embodiment, the apertures 360 may converge then diverge, when viewed with respect to the downward flow of the feedstock 16 through the gasifier 14.

A lower intermediate section 276 in accordance with the present invention may include a collar 368 extending downward therefrom. When assembled, a collar 368 may extend downward to contact a grate 292. In selected embodiments, a collar 368 may shield a shaft 168 extending therethrough from the temperatures and contents of the interior of a lower manifold 274 (i.e., the reduction zone).

Figure 24:
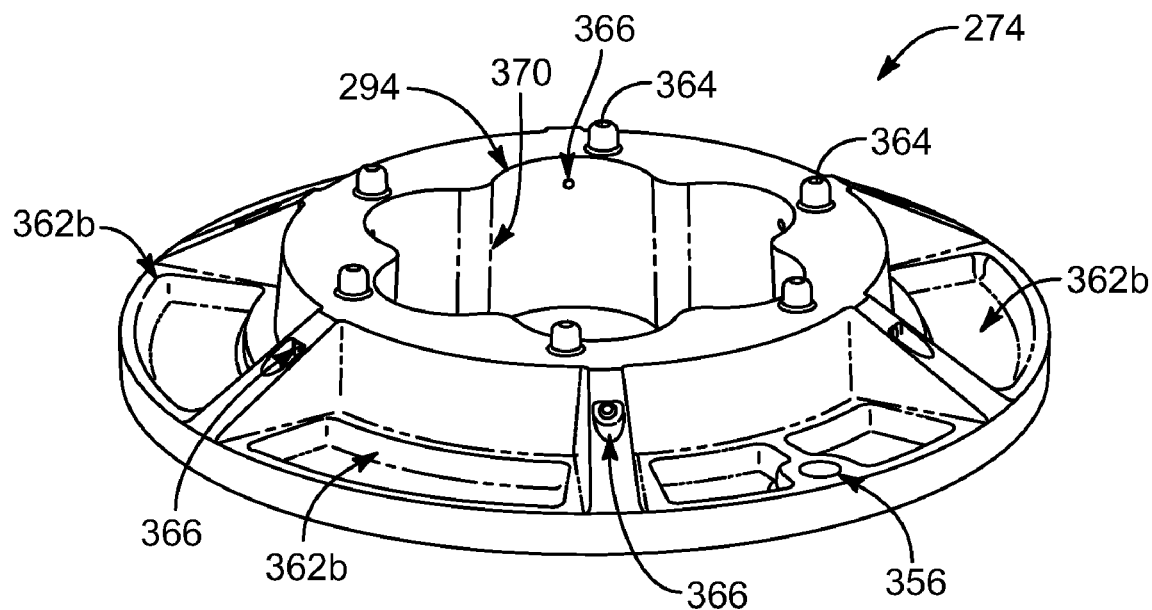
FIG. 24 is a top, perspective view of one embodiment of a lower manifold of a refractory stack in accordance with the present invention.
Figure 25:
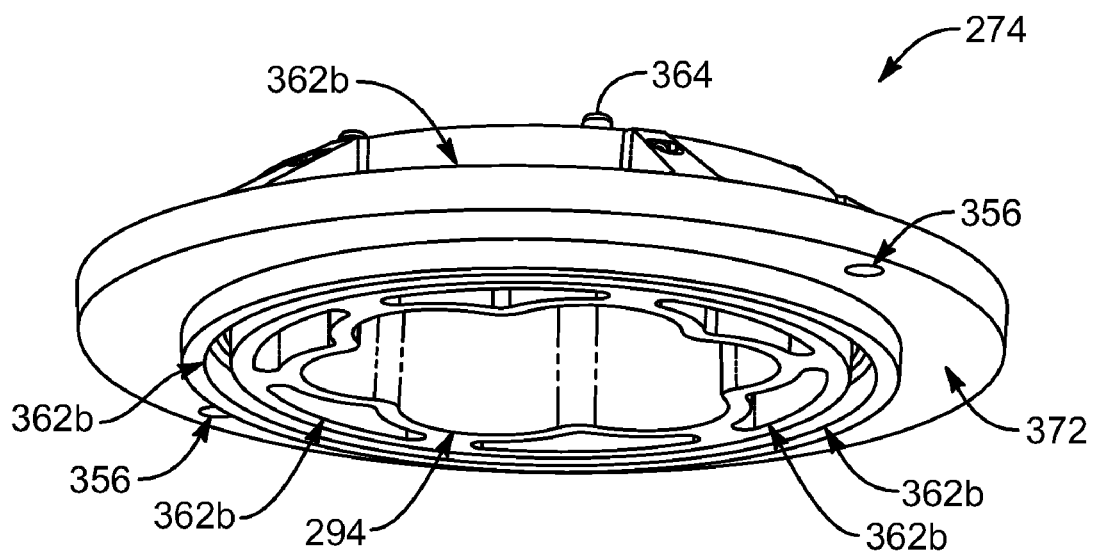
FIG. 25 is a bottom, perspective view of the lower manifold of FIG. 24.

Referring to FIGS. 24 and 25, a lower manifold 274 may include an aperture 294 extending vertically therethrough. In selected embodiments, the perimeter 370 of the aperture 294 may undulate, varying in and out in a radial direction along a path extending in a circumferential direction. When assembled, an aperture 294 of a lower manifold 274 may combine with the collar of a lower intermediate section 276 to form an annular region. Balls 296 supported by a grate 292 may define the floor of the annular region. Accordingly, when the grate 292 rotates with the shaft 168, the balls 296 may be mixed somewhat as they circulate around the annular region.

A lower manifold 274 in accordance with the present invention may include a shoulder 372. A shoulder 372 may extend circumferentially around a lower portion of the manifold 274. A shoulder 372 may provide a base suitable for supporting a refractry stack 272 on the upper plate 320 of a lower section 156 of a gasifier 14. In selected embodiments, a shoulder 372 may include one or more apertures sized and positioned to engage the pins 322 extending from an upper plate 320, ensuring a proper and secure alignment therebetween.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
  selecting a downdraft gasifier comprising:
    a housing,
    a refractory stack contained within the housing and comprising a plurality of sections formed of refractory, the plurality of sections comprising a lower manifold, at least one intermediate section resting on and extending upward from the lower manifold, and an upper manifold resting on and extending upward from the at least one intermediate section, and
  the refractory stack wherein the upper manifold and the at least one intermediate section each comprise a plurality of apertures extending vertically therethrough, the plurality of apertures of the upper manifold aligning with the plurality of apertures of the at least one intermediate section to form a plurality of columnar cavities, each extending from the upper manifold to the lower manifold and placing the upper manifold in communication with the lower manifold;
  placing a feedstock into the upper manifold;

measuring the temperature of each columnar cavity of the plurality of columnar cavities; and adjusting the flow of at least one gas selected from the group consisting of oxygen, oxygen enriched air, and air to a particular columnar cavity to maintain the temperature of the particular columnar cavity within a particular range.

2. The method of claim 1, wherein adjusting comprises increasing the flow of the at least one gas to raise the temperature of the particular columnar cavity and decreasing the flow of the at least one gas to lower the temperature of the particular columnar cavity.

3. The method of claim 1, wherein the downdraft gasifier further comprises a shaft system comprising at least one motor and a shaft, the shaft extending vertically through the housing, the at least one motor connected to rotate the shaft about an axis extending vertically.

4. The method of claim 3, further comprising rotating, by the at least one motor, the shaft about the axis extending vertically.

5. The method of claim 4, wherein the downdraft gasifier further comprises a mixing blade connected to rotate with the shaft and mix the contents of the upper manifold.

6. The method of claim 5, further comprising scraping, by the mixing blade, the contents of the upper manifold away from an interior surface of the upper manifold.

7. The method of claim 4, wherein the downdraft gasifier further comprises at least one wiper blade connected to rotate with the shaft.

8. The method of claim 7, further comprising urging, by the at least one wiper blade, the contents of the lower section toward the ash outlet.

9. The method of claim 4, wherein the lower manifold comprises an aperture extending vertically therethrough, the aperture having an undulating perimeter.

10. The method of claim 9, wherein the downdraft gasifier further comprises a grate connected to rotate with the shaft and positioned adjacent the lower manifold.

11. The method of claim 10, wherein the downdraft gasifier further comprises a plurality of balls supported by the grate and held by the grate within the aperture of the lower manifold.

12. The method of claim 11, further comprising agitating, by the undulating perimeter, the plurality of balls as the grate rotates with the shaft.

13. The method of claim 1, wherein the housing further comprises a base, a lower section resting on and extending upward from the base, an intermediate section resting on and extending upward from the lower section, and an upper section resting on and extending upward from the intermediate section, the lower section comprising a gas outlet and a waste outlet, the upper section comprising a feedstock inlet.

14. The method of claim 13, wherein the refractory stack is housed with the intermediate section.

15. The method of claim 14, wherein placing the feedstock further comprises passing the feedstock into the upper section through the feedstock inlet.

16. The method of claim 15, further comprising extracting syn-gas out of the lower section through the gas outlet.

17. The method of claim 1, wherein the downdraft gasifier further comprises:

a plurality of electrical resistance heaters, each delivering heat to at least one columnar cavity of the plurality of columnar cavities;

a plurality of temperature sensors, each outputting a signal corresponding to the temperature of at least one columnar cavity of the plurality of columnar cavities; and a plurality of ports, each delivering at least one gas selected from the group consisting of oxygen, oxygen enriched air, and air to at least one columnar cavity of the plurality of columnar cavities.

18. The method of claim 17, wherein the downdraft gasifier further comprises:

a coolant system comprising coolant passing through a cooling jacket encircling the lower section;

a feed system controlling passage of feedstock into the upper section;

an extraction system pulling gas out of the lower section through the gas outlet; and a control system monitoring the output of each sensor of the plurality of temperature sensors and performing the adjusting.

19. The method of claim 1, further comprising:

grinding municipal solid waste to produce a first output;

mixing into the first output at least one of a quantity of zeolite and a quantity of dolomite to produce a second output;

pelletizing the second output to form the feedstock.

20. The method of claim 1, further comprising:

starting the gasifier;

wherein the downdraft gasifier further comprises a plurality of electrical resistance heaters, each delivering heat to at least one columnar cavity of the plurality of columnar cavities; and wherein starting comprises delivering, before the placing, sufficient current to each heater of the plurality of electrical resistance heaters to raise the temperate of each columnar cavity of the plurality of columnar cavities into the particular range.

* * * * *